United States Patent
Meshkati et al.

(10) Patent No.: US 8,792,886 B2
(45) Date of Patent: Jul. 29, 2014

(54) FEMTO NODE POWER ADJUSTMENT USING REQUESTS FOR REGISTRATION

(75) Inventors: Farhad Meshkati, San Diego, CA (US); Vinay Chande, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 502 days.

(21) Appl. No.: 12/765,375

(22) Filed: Apr. 22, 2010

(65) Prior Publication Data

US 2010/0273481 A1 Oct. 28, 2010

Related U.S. Application Data

(60) Provisional application No. 61/172,033, filed on Apr. 23, 2009, provisional application No. 61/172,038, filed on Apr. 23, 2009, provisional application No. 61/304,284, filed on Feb. 12, 2010, provisional application No. 61/174,611, filed on May 1, 2009.

(51) Int. Cl.
   *H04W 4/00* (2009.01)

(52) U.S. Cl.
   USPC ........ 455/435.1; 455/522; 455/444; 455/574; 455/69; 455/423

(58) Field of Classification Search
   USPC ............... 455/522, 444, 435.1; 370/331–333
   See application file for complete search history.

(56) References Cited

U.S. PATENT DOCUMENTS

| | | | |
|---|---|---|---|
| 8,032,142 B2 * | 10/2011 | Carter et al. .................. | 455/444 |
| 8,126,496 B2 * | 2/2012 | Brisebois et al. ............. | 455/522 |
| 8,271,014 B2 * | 9/2012 | Gholmieh et al. ............ | 455/522 |
| 8,311,541 B2 * | 11/2012 | Yano et al. .................... | 455/436 |
| 2004/0106410 A1 * | 6/2004 | Choi et al. ..................... | 455/446 |
| 2007/0042799 A1 * | 2/2007 | Jubin et al. .................... | 455/522 |
| 2007/0270151 A1 * | 11/2007 | Claussen et al. .............. | 455/444 |
| 2009/0042593 A1 * | 2/2009 | Yavuz et al. ................... | 455/522 |
| 2009/0042594 A1 | 2/2009 | Yavuz et al. | |
| 2010/0177722 A1 | 7/2010 | Guvenc | |

(Continued)

FOREIGN PATENT DOCUMENTS

| CN | 101026445 A | 8/2007 |
|---|---|---|
| EP | 1936829 A1 | 6/2008 |

(Continued)

OTHER PUBLICATIONS

International Search Report and Written Opinion—PCT/US2010/032286, International Search Authority—European Patent Office—Aug. 16, 2010.

(Continued)

*Primary Examiner* — Sharad Rampuria

(57) ABSTRACT

Systems, devices, and methods for adjusting a transmission power at a femto node are described herein. According to the systems, devices, and methods herein, a measurement of a signal transmitted from a transmitting node may be communicated to the femto node, for example from a user equipment or a neighboring femto node, for use in adjusting the power. The transmitting node may comprise the femto node, a macro node, or a neighboring femto node. In addition, statistics regarding such measurements may be communicated to the femto node for use in adjusting the power. The femto node may also adjust the power based on unsuccessful registration attempts or interference communications received at the femto node.

68 Claims, 13 Drawing Sheets

(56) References Cited

U.S. PATENT DOCUMENTS

| | | | |
|---|---|---|---|
| 2010/0190447 A1 | 7/2010 | Agrawal et al. | |
| 2010/0238905 A1 | 9/2010 | Hamabe et al. | |
| 2010/0273432 A1 | 10/2010 | Meshkati et al. | |
| 2010/0273471 A1 | 10/2010 | Meshkati et al. | |
| 2010/0273473 A1 | 10/2010 | Meshkati et al. | |
| 2011/0003597 A1 | 1/2011 | Budic et al. | |

FOREIGN PATENT DOCUMENTS

| | | |
|---|---|---|
| EP | 2160062 | 3/2010 |
| EP | 2200360 A1 | 6/2010 |
| GB | 2448194 A | 10/2008 |
| GB | 2450123 | 12/2008 |
| JP | 2009542043 A | 11/2009 |
| WO | 2007139680 A2 | 12/2007 |
| WO | 2008076219 | 6/2008 |
| WO | WO2008093100 | 8/2008 |
| WO | WO2008098898 | 8/2008 |
| WO | 2008122824 A2 | 10/2008 |
| WO | WO2009039439 | 3/2009 |
| WO | WO2009044318 | 4/2009 |
| WO | WO2009047972 A1 | 4/2009 |

OTHER PUBLICATIONS

Mitsubishi Electric: "HeNBs and X2 interface" 3GPP Draft; R3-082476 (X2 for HNBS), 3rd Generation Partnership Project (3GPP), Mobile Competence Centre ; 650, Route Des Lucioles ; F-06921 Sophia-Antipolis Cedex; France, no. Prague, Czech Republic; 2008092.

Nortel,et al., "Open and Closed Access for Home NodeBs," Aug. 2007, 3GPP TSG-RAN WG4 Meeting #44, Athens, Greece. XP50177693A.

Huawei: "Interference mitigation consideration for HNB", R4-081751, 3GPP TSG-RAN Working Group 4 (Radio) meeting #48, Aug. 22, 2008.

Qualcomm Europe: "Proposal for the summary and conclusion of the HNB study item", R4-080330, 3GPP TSG-RAN WG4 #46, Feb. 15, 2008.

Taiwan Search Report—TW099112951—TIPO—May 16, 2013.

3GPP, "Enhanced Interference Management for HNBs", 3GPP Work Item Description, RP-090361, Mar. 2009, 6 Pages.

3GPP TS 25.331 v8.3.0, "Radio Resource Control (RRC); Protocol specification", 2008, 1494 Pages.

3rd Generation Partnership Project; Technical Specification Group Radio Access Networks; FDD Home NodeB RF Requirements Work Item Technical Report (Release 8), 3GPP Standard; 3GPP TR 25.967, 3rd Generation Partnership Project (3GPP), Mobile Competence Centre; 650, Route des Lucioles; F-06921 Sophia-Antipolis Cedex; France, No. 2.0.0, Feb. 1, 2009, pp. 1-58, XP05038087.

Motorola: "RAN4 work item description Fdd Home NodeB Rf requirements", 3GPP TSG RAN Meeting #39, RP-080234, Puerto Vallarta, Mar. 4-6, 2008, 4 Pages.

NTT DOCOMO: "Enhanced HNB interference coordination based on network control", 8.4 Enhanced Interference Management for HNBs, TSG-RAN Working Group 4 (Radio) meeting #50bis, R4-091463, Seoul, Korea, Mar. 23-27, 2009, 5 Pages.

Qualcomm Europe: "Minimum Transmit Power for HNBs", 3GPP TSG-RAN WG4 Meeting #48, R4-081885, Jeju Island, Korea, Aug. 18-22, 2008, 6 Pages.

Qualcomm Europe: "Overview of Interference Scenarios for the Home NodeB Enhanced Interference Management Study Item", 3GPP TSG-RAN WG4 Meeting #50bis, R4-091227, Seoul, South Korea, Mar. 23-27, 2009, 3 Pages.

\* cited by examiner

US 8,792,886 B2

FEMTO NODE POWER ADJUSTMENT USING REQUESTS FOR REGISTRATION

CLAIM OF PRIORITY UNDER 35 U.S.C. §119

The present Application for Patent claims priority to U.S. Provisional Application No. 61/172,033, entitled "Home User Equipment Assisted Home NodeB Power Calibration," filed Apr. 23, 2009; U.S. Provisional Application No. 61/172,038, entitled "Macro User Equipment Assisted Home NodeB Power Calibration," filed Apr. 23, 2009; U.S. Provisional Application No. 61/174,611, entitled "MUE REGISTRATION BASED HNB POWER CALIBRATION," filed May 1, 2009; and U.S. Provisional Application No. 61/304,284, entitled "Macro User Equipment Assisted Home NodeB Power Calibration," filed Feb. 12, 2010. The above-referenced applications are hereby expressly incorporated by reference herein in their entireties.

REFERENCE TO CO-PENDING APPLICATIONS FOR PATENT

The present Application for Patent is related to the following co-pending U.S. patent applications:

"Femto Node Power Adjustment in Wireless Communication Systems," having Ser. No. 12/765,382, filed concurrently herewith, assigned to the assignee hereof, and expressly incorporated by reference herein.

"Communication of an Interference Condition in Wireless Communications Systems," having Ser. No. 12/765,391, filed concurrently herewith, assigned to the assignee hereof, and expressly incorporated by reference herein.

"Measurement Aggregation in Wireless Communications Systems," having Ser. No. 12/765,398, filed concurrently herewith, assigned to the assignee hereof, and expressly incorporated by reference herein.

BACKGROUND

1. Field

The present application relates generally to wireless communication, and more specifically to systems and methods for adjusting a transmit power at a femto node.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In addition to mobile phone networks currently in place, a new class of small base stations has emerged, which may be installed in a user's home and provide indoor wireless coverage to mobile units using existing broadband Internet connections. Such personal miniature base stations are generally known as access point base stations, or, alternatively, Home Node B (HNB) or femto nodes. Typically, such miniature base stations are connected to the Internet and the mobile operator's network via a DSL router or a cable modem.

Multiple femto nodes may be deployed by individual users in the coverage area of a traditional macro node (Macro Node B, or MNB). Users receiving communications from a femto node may detect signals from the macro node in some situations, and users receiving communications from the macro node may in some situations detect signals from the femto node. In order to accurately receive such communications, it is advantageous to reduce the interference experienced by these users. Thus, methods, systems, and devices for reducing interference caused by a femto node are desirable.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include determining an appropriate transmission power of a femto node.

One aspect of the disclosure is an apparatus for wireless communication. The apparatus comprises a transmitter configured to wirelessly transmit a first signal with a first power to a reception region. The apparatus further comprises a receiver configured to wirelessly receive a request for registration from one or more user devices. The apparatus further comprises a registration unit configured to store information identifying at least one user device. In some embodiments, only user devices that are identified in the registration unit are permitted to communicate with other user devices via the transmitter and via the receiver. The apparatus further comprises a power adjustment unit configured to adjust the first power based at least in part on a characteristic of the request for registration from the one or more user devices. In some embodiments, the power adjustment unit is configured to adjust the power if information in the registration unit does not identify the one or more user devices.

Another aspect of the disclosure is a method of wireless communication. The method comprises wirelessly transmitting a first signal with a first power to a reception region. The method further comprises receiving a request for registration from one or more user devices. The method further comprises determining that the one or more user devices are not identified in a registration unit configured to store information identifying at least one user device. The method further comprises adjusting the first power based at least in part on a characteristic of the request for registration from the one or more user devices.

Yet another aspect of the disclosure is an apparatus for wireless communication. The apparatus comprises means for wirelessly transmitting a first signal with a first power to a reception region. The apparatus further comprises means for receiving a request for registration from one or more user devices. The apparatus further comprises means for determining that the one or more user devices are not identified in a registration unit configured to store information identifying at least one user device. The apparatus further comprises means for adjusting the first power based at least in part on a characteristic of the request for registration from the one or more user devices.

Still another aspect of the disclosure is a computer program product comprising a computer-readable medium. The computer-readable medium comprises code for causing a computer to wirelessly transmit a first signal with a first power to a reception region. The computer-readable medium further comprises code for causing a computer to receive a request for registration from one or more user devices. The computer-readable medium further comprises code for causing a computer to determine that the one or more user devices are not identified in a registration unit configured to store information identifying at least one user device. The computer-readable medium further comprises code for causing a computer to adjust the first power based at least in part on a characteristic of the request for registration from the one or more user devices.

DETAILED DESCRIPTION

Figure 1:
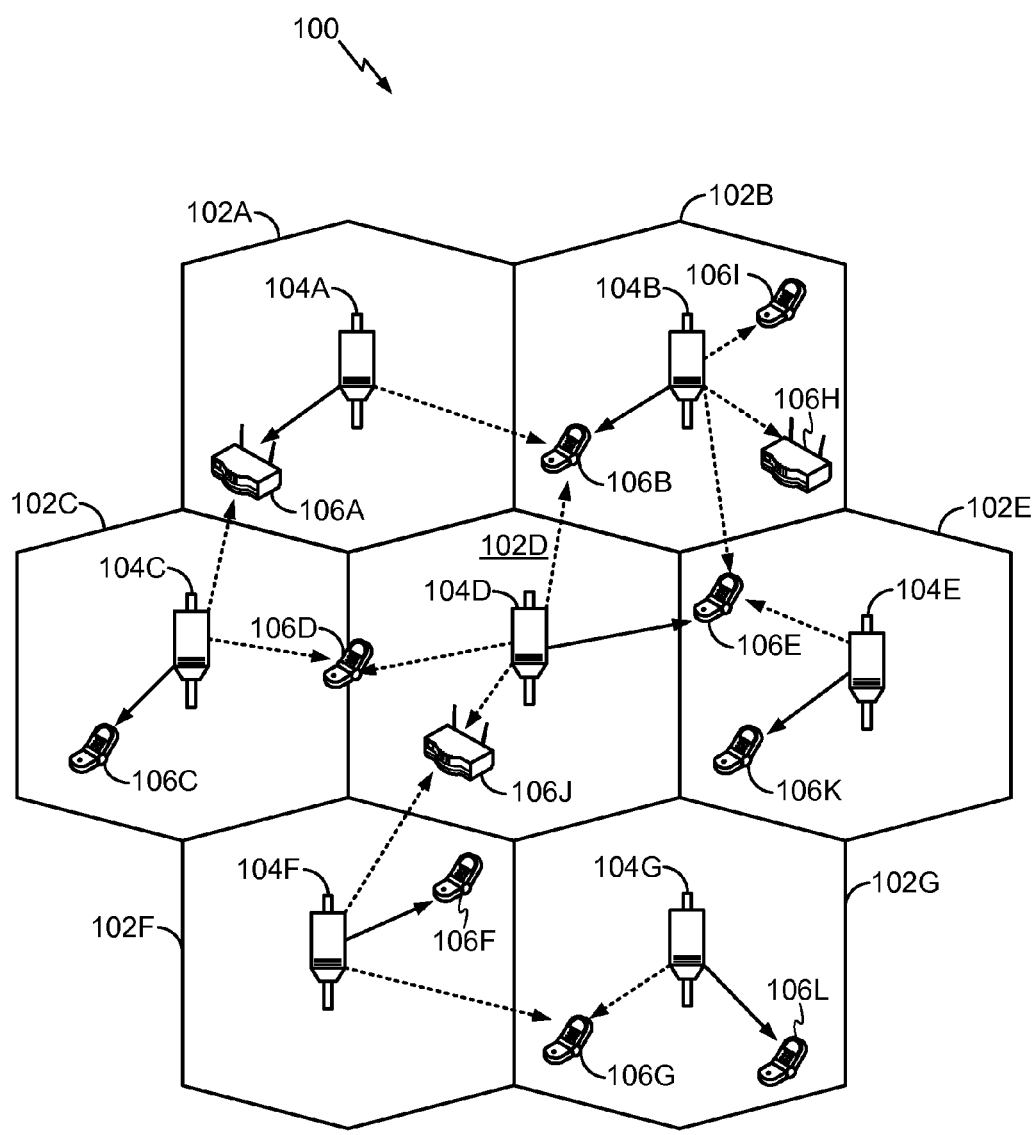
FIG. 1 illustrates an exemplary wireless communication network.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As a user equipment ("UE") moves through such a network, the user equipment may be served in certain locations by access nodes ("ANs") that provide macro coverage while the user equipment may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

FIG. 1 illustrates an exemplary wireless communication network 100. The wireless communication network 100 is configured to support communication between a number of users. The wireless communication network 100 may be divided into one or more cells 102, such as, for example, cells 102A-102G. Communication coverage in cells 102A-102G may be provided by one or more nodes 104, such as, for example, nodes 104A-104G. Each node 104 may provide communication coverage to a corresponding cell 102. The nodes 104 may interact with a plurality of user equipments (UEs), such as, for example, UEs 106A-106L.

Each UE 106 may communicate with one or more nodes 104 on a forward link (FL) and/or a reverse link (RL) at a given moment. A FL is a communication link from a node to a UE. A RL is a communication link from a UE to a node. The nodes 104 may be interconnected, for example, by appropriate wired or wireless interfaces and may be able to communicate with each other. Accordingly, each UE 106 may communicate with another UE 106 through one or more nodes 104. For example, the UE 106J may communicate with the UE 106H as follows. The UE 106J may communicate with the node 104D. The node 104D may then communicate with the node 104B. The node 104B may then communicate with the UE 106H. Accordingly, a communication is established between the UE 106J and the UE 106H.

The wireless communication network 100 may provide service over a large geographic region. For example, the cells 102A-102G may cover only a few blocks within a neighborhood or several square miles in a rural environment. In one embodiment, each cell may be further divided into one or more sectors (not shown).

As described above, a node 104 may provide a user equipment (UE) 106 access within its coverage area to a communications network, such as, for example the internet or a cellular network.

A UE 106 may be a wireless communication device (e.g., a mobile phone, router, personal computer, server, etc.) used by a user to send and receive voice or data over a communications network. A user equipment (UE) may also be referred to herein as an access terminal (AT), as a mobile station (MS), or as a terminal device. As shown, UEs 106A, 106H, and 106J comprise routers. UEs 106B-106G, 106I, 106K, and 106L comprise mobile phones. However, each of UEs 106A-106L may comprise any suitable communication device.

Figure 2:
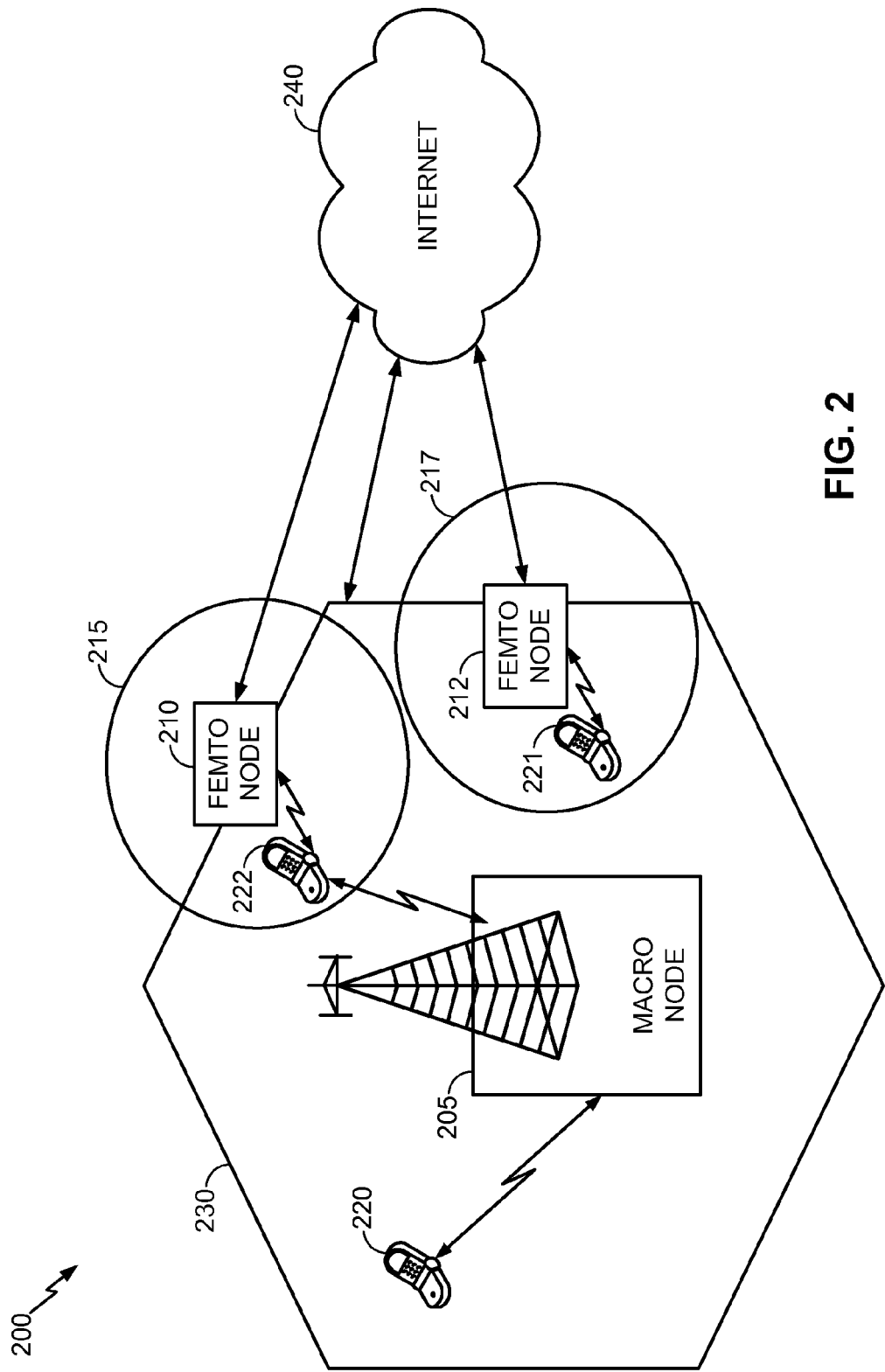
FIG. 2 illustrates exemplary interoperations of two or more communication networks.

FIG. 2 illustrates exemplary interoperations of two or more communication networks. It may be desirable for a UE 220 to transmit information to and receive information from another UE such as UE 221. FIG. 2 illustrates a manner in which the UEs 220, 221, and 222 may communicate with each other. As shown in FIG. 2, the macro node 205 may provide communication coverage to user equipments within a macro area 230. For example, the UE 220 may generate and transmit a message to the macro node 205. The message may comprise information related to various types of communication (e.g., voice, data, multimedia services, etc.). The UE 220 may communicate with the macro node 205 via a wireless link. The macro node 205 may communicate with a network 240 via a wired link or via a wireless link. The femto nodes 210 and 212 may also communicate with the network 240 via a wired link or via a wireless link. The UE 222 may communicate with the femto node 210 via a wireless link and the UE 221 may communicate with the femto node 212 via a wireless link.

The macro node 205 may also communicate with devices such as servers (not shown in FIG. 2) and switching centers (not shown in FIG. 2) through the network 240. For example, the macro node 205 may transmit the message received from the UE 220 to a switching center (not shown in FIG. 2), which may forward the message to another network. The network 240 may also be used to facilitate communication between the UEs 220, 221, and 222. For example, the UE 220 may be in communication with the UE 221. The UE 220 may transmit a message to the macro node 205. The macro node 205 may forward the message to the network 240. The network 240 may forward the messages to the femto node 212. The femto node 212 may forward the message to the UE 221. Similarly, the reverse path may be followed from the UE 221 to the UE 220. In another example, the UE 221 may be in communication with the UE 222. The UE 221 may transmit a message to the femto node 212. The femto node 212 may forward the message to the network 240. The network 240 may forward the message to the femto node 210. The femto node 210 may forward the message to the UE 222. Similarly, the reverse path may be followed from the UE 222 to the UE 221.

In one embodiment, the femto nodes 210, 212 may be deployed by individual consumers and placed in homes, apartment buildings, office buildings, and the like. The femto nodes 210, 212 may communicate with the UEs in a predetermined range (e.g., 100*m*) of the femto nodes 210, 212 utilizing a predetermined cellular transmission band. In one embodiment, the femto nodes 210, 212 may communicate with the network 240 by way of an Internet Protocol (IP) connection, such as a digital subscriber line (DSL, e.g., including asymmetric DSL (ADSL), high data rate DSL (HDSL), very high speed DSL (VDSL), etc.), a TV cable carrying Internet Protocol (IP) traffic, a broadband over power line (BPL) connection, or other link.

The network 240 may comprise any type of electronically connected group of computers and/or devices including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), or Bluetooth (IEEE 802.15.1). Note that computing devices may be desktop, server, portable, hand-held, set-top, or any other desired type of configuration. As used herein, the network 240 includes network variations such as the public Internet, a private network within the Internet, a secure network within the Internet, a private network, a public network, a value-added network, an intranet, and the like. In certain embodiments, network 240 may also comprise a virtual private network (VPN).

The macro node 205 and/or either or both of the femto nodes 210 and 212 may be connected to the network 240 using any of a multitude of devices or methods. As described above, the femto node 210 may be connected to the network 240 using an IP connection or other means. The macro node 205 may be connected to the network 240 by similar means or by other public, private, or proprietary means. The connections to the network 240 may be wired or wireless. These connections, which connect the macro node 205 and/or either or both of the femto nodes 210 and 212 to the network 240, which may be referred to as the "backbone" of the network, may be referred to as the backhaul. Devices such as a radio network controller (RNC), base station controller (BSC), or another device or system (not shown) may be used to manage communications between two or more macro nodes, pico nodes, and/or femto nodes. In some embodiments, messages are communicated over the backhaul utilizing a radio access network application part (RANAP) protocol. In one embodiment, messages are communicated over the backhaul utilizing an radio access network information management (RIM) procedure. Those of skill in the art will appreciate other devices and methods for communicating with the network 240.

Figure 3:
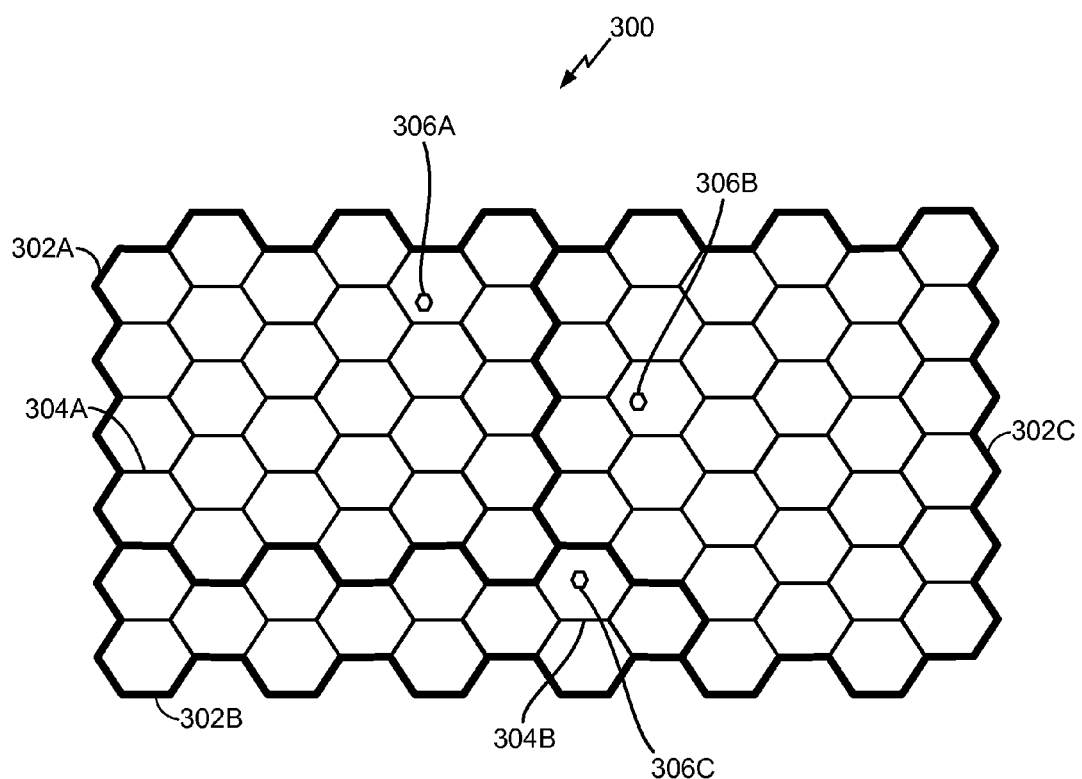
FIG. 3 illustrates exemplary coverage areas of the wireless communication networks shown in FIGS. 1 and 2.

FIG. 3 illustrates exemplary coverage areas of the wireless communication networks 100 and 200 shown in FIGS. 1 and 2. The coverage area 300 may comprise one or more geographical areas in which the UE 220 may access the communication network 240 as discussed above with respect to FIG. 2. As shown the coverage area 300 comprises several tracking areas 302 (or routing areas or location areas). Each tracking area 302 comprises several macro areas 304, which may be similar to the macro area 230 described above with respect to FIG. 2. Here, areas of coverage associated with tracking areas 302A, 302B, and 302C are shown as delineated by wide lines as and the macro areas 304 are represented by hexagons. The tracking areas 302 may also comprise femto areas 306, which may be similar to the femto area 230 described above with respect to FIG. 2. In this example, each of the femto areas 306 (e.g., femto area 306C) is depicted within a macro area 304 (e.g., macro area 304B). It should be appreciated, however, that a femto area 306 may not lie entirely within a macro area 304. In practice, a large number of femto areas 306 may be defined with a given tracking area 302 or macro area 304.

Also, one or more pico areas (not shown) may be defined within a given tracking area 302 or macro area 304.

Referring again to FIG. 2, the owner of the femto node 210 may subscribe to a mobile service, such as, for example, 3G mobile service, offered through the communication network 240 (e.g., a mobile operator core network). In addition, a user equipment 221 may be capable of operating both in macro environments (e.g., macro areas) and in smaller scale (e.g., residential, femto areas, pico areas, etc.) network environments. In other words, depending on the current location of the user equipment 221, the user equipment 221 may access the communication network 240 by a macro node 205 or by any one of a set of femto nodes (e.g., femto nodes 210, 212). For example, when a subscriber is outside his home, he may be served by a macro node (e.g., node 205) and when the subscriber is at home, he may be served by a femto node (e.g., node 210). It should further be appreciated that the femto nodes 210 may be backward compatible with existing user equipments 221.

The femto node 210 may communicate over a single frequency or, in the alternative, over multiple frequencies. Depending on the particular configuration, the single frequency or one or more of the multiple frequencies may overlap with one or more frequencies used by a macro node (e.g., node 205).

In one embodiment, a user equipment 221 may be configured to connect to a particular (e.g., preferred) femto node (e.g., a home femto node of the user equipment 221) whenever the user equipment 221 is within communication range of the femto node. For example, the user equipment 221 may communicate with only the femto node 210 when the user equipment 221 is within the femto area 215.

In another embodiment, the user equipment 221 is communicating with a node but is not communicating with a preferred node (e.g., as defined in a preferred roaming list). In this embodiment, the user equipment 221 may continue to search for a preferred node (e.g., the preferred femto node 210) using a Better System Reselection ("BSR"). The BSR may comprise a method comprising a periodic scanning of available systems to determine whether better systems are currently available. The BSR may further comprise attempting to associate with available preferred systems. The user equipment 221 may limit the BSR to scanning over one or more specific bands and/or channels. Upon discovery of a preferred femto node 210, the user equipment 221 selects the femto node 210 for communicating with to access the communication network 240 within the femto area 215.

For example, when the UE 221, which may be communicating with the macro node 205, gets close to the femto node 210, it may handoff (i.e., idle or active handoff) to the femto node 210. Accordingly, the UE 222 begins communicating with the femto node 210. In mobile networks such as 1xRTT, 1xEV-DO, WCDMA, HSPA, etc., when a user equipment gets close to a node, there are mechanisms to trigger the handoff. Conditions of the network that trigger the handoff may be referred to as handoff conditions. For example, each node (e.g., femto node, macro node, etc.) may be configured to generate and transmit a beacon. The beacon may comprise pilot channels and other overhead channels. Further, the beacon may be transmitted on multiple frequencies such that UEs operating on different frequencies can detect the beacon. The UE may use the beacon received from a node to identify the node, for example for purposes of performing a handoff when a handoff condition is identified.

In some embodiments, a UE may uniquely identify a femto node by detecting a beacon or pilot signal transmitted from the femto node. In one embodiment, the beacon transmitted from one or more femto nodes comprises pilot signals of the femto node. The pilot signals may uniquely identify the femto node from which they were transmitted. For example, femto nodes 210 and 212 may each transmit a different pilot signal. The UE 221 may receive both pilot signals from each of the femto nodes 210 and 212. In some embodiments, the UE 221 may generate a pilot strength measurement report (PSMR), or other indicator of signal quality. The PSMR may comprise the received pilot signals. The PSMR may further comprise the signal strength ($E_{cp}/I_o$) of the pilot signals. The UE 221 may transmit the PSMR in a measurement report message (MRM) to the macro node 205 with which it is communicating, or to one or both of the femto nodes 210 and 212, as will be described in additional detail below.

In one embodiment, a node may only provide certain services to certain user equipments with which it is provisioned to communicate. Such a node may be referred to as a "restricted" or "closed" node. In wireless communication networks comprising restricted femto nodes, a given user equipment may only be served by macro nodes and a defined set of femto nodes (e.g., the femto node 210). In other embodiments, a node may be restricted to not provide at least one of: signaling, data access, registration, paging, or service.

In one embodiment, a restricted femto node (which may also be referred to as a Closed Subscriber Group Home NodeB) is one that provides service to a restricted provisioned set of user equipments. This set may be temporarily or permanently changed to include additional or fewer user equipments as necessary. In some aspects, a Closed Subscriber Group ("CSG") may be defined as the set of access nodes (e.g., femto nodes) that share a common access control list of user equipments (e.g., a list of the restricted provisioned set of user equipments). A channel on which all femto nodes (or all restricted femto nodes) in a region operate may be referred to as a femto channel.

Various relationships may thus exist between a given femto node and a given user equipment. For example, from the perspective of a user equipment, an open femto node may refer to a femto node with no restricted association. A restricted or closed femto node may refer to a femto node that is restricted in some manner (e.g., restricted for association and/or registration). A hybrid femto node may refer to a femto node where a limited amount of the femto nodes resources are available to all users, while the rest are operated in a restricted manner. A home femto node may refer to a femto node on which the user equipment is subscribed to/authorized to access and operate on. A guest femto node may refer to a femto node on which a user equipment is temporarily subscribed to/authorized to access or operate on. An alien femto node may refer to a femto node on which the user equipment is not authorized to access or operate on, except for perhaps emergency situations (e.g., 911 calls).

From a restricted femto node perspective, a home user equipment may refer to a user equipment that is subscribed to/authorized to access the restricted femto node. A guest user equipment may refer to a user equipment with temporary subscription/access to the restricted femto node. An alien user equipment may refer to a user equipment that does not have permission to access the restricted femto node, except for perhaps emergency situations, such as 911 calls.

For convenience, the disclosure herein describes various functionalities related to a femto node. It should be appreciated, however, that a pico node may provide the same or similar functionality for a larger coverage area. For example, a pico node may be restricted, a home pico node may be defined for a given user equipment, and so on.

A wireless multiple-access communication system may simultaneously support communication for multiple wireless user equipments. As mentioned above, each user equipment may communicate with one or more nodes via transmissions on the forward and reverse links. The forward link (or downlink) refers to the communication link from the node to the user equipment, and the reverse link (or uplink) refers to the communication link from the user equipment to the node. This communication link may be established via a single-in-single-out system, a multiple-in-multiple-out ("MIMO") system, or some other type of system.

A MIMO system employs multiple (NT) transmit antennas and multiple (NR) receive antennas for data transmission. A MIMO channel formed by the NT transmit and NR receive antennas may be comprise NS independent channels, which are also referred to as spatial channels, where NS≤min {NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables a device (e.g., a node, a user equipment, etc.) to extract a transmit beam-forming gain on the forward link when multiple antennas are available at the device.

The teachings herein may be incorporated into a device (e.g., a node, a user equipment, etc.) employing various components for communicating with at least one other device.

Figure 4:
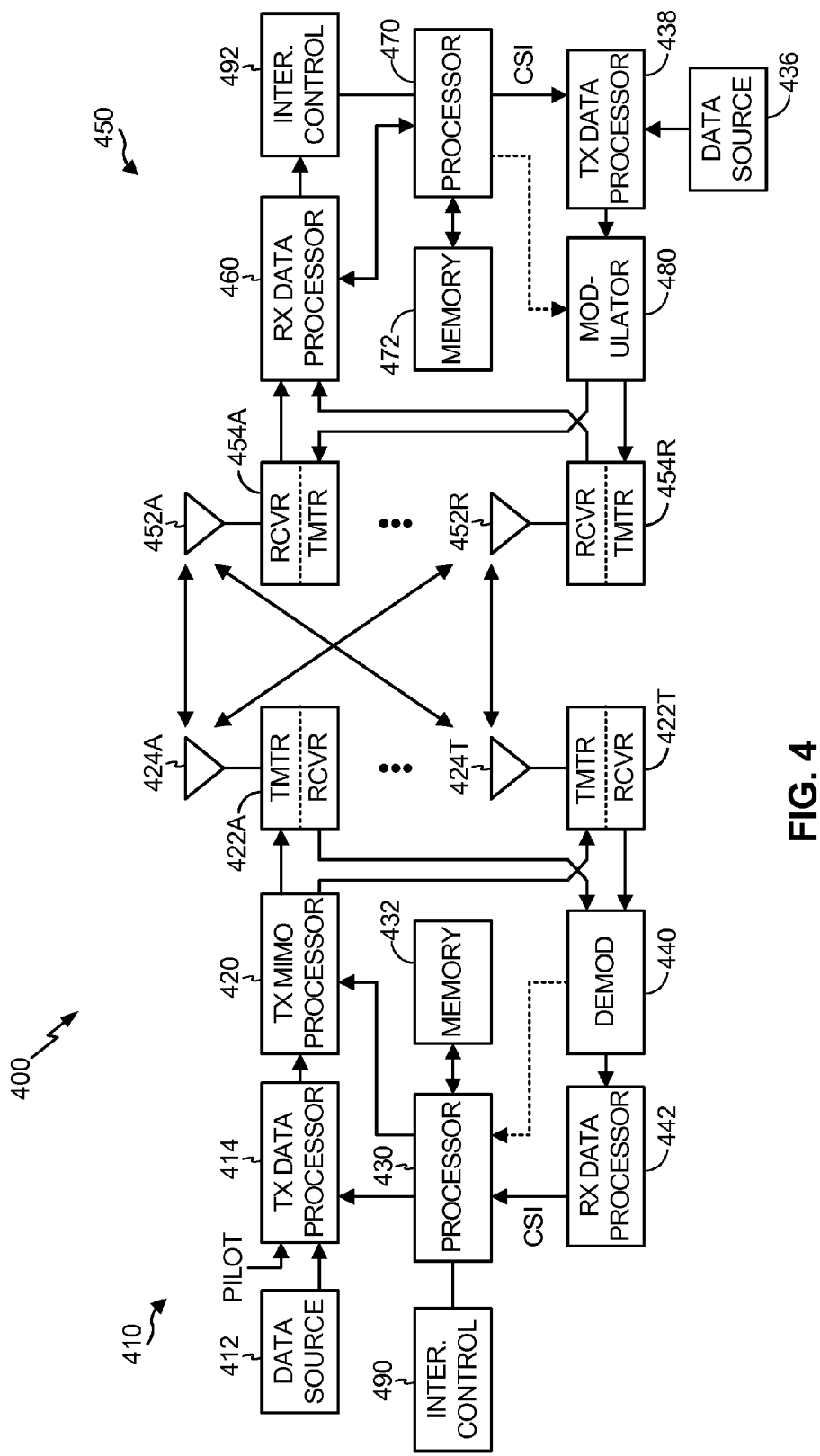
FIG. 4 is a functional block diagram of a first exemplary femto node and a first exemplary user equipment in one of the communication networks of FIG. 2.

FIG. 4 is a functional block diagram of a first exemplary femto node 410 and a first exemplary user equipment 450 in one of the communication networks of FIG. 2. As shown, a MIMO system 400 comprises a femto node 410 and a user equipment 450 (e.g., the UE 222). At the femto node 410, traffic data for a number of data streams is provided from a data source 412 to a transmit ("TX") data processor 414.

In one embodiment, each data stream is transmitted over a respective transmit antenna. The TX data processor 414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 430. A data memory 432 may store program code, data, and other information used by the processor 430 or other components of the femto node 410.

The modulation symbols for all data streams are then provided to a TX MIMO processor 420, which may further process the modulation symbols (e.g., for OFDM). The TX MIMO processor 420 then provides NT modulation symbol streams to NT transceivers ("XCVR") 422A through 422T. In some aspects, the TX MIMO processor 420 applies beam-forming weights to the symbols of the data streams and to the antenna from which the symbol is being transmitted.

Each transceiver 422 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 422A through 422T are then transmitted from NT antennas 424A through 424T, respectively.

At the user equipment 450, the transmitted modulated signals are received by NR antennas 452A through 452R and the received signal from each antenna 452 is provided to a respective transceiver ("XCVR") 454A through 454R. Each transceiver 454 conditions (e.g., filters, amplifies, and downconverts) a respective received signal, digitizes the conditioned signal to provide samples, and further processes the samples to provide a corresponding "received" symbol stream.

A receive ("RX") data processor 460 then receives and processes the NR received symbol streams from NR transceivers 454 based on a particular receiver processing technique to provide NT "detected" symbol streams. The RX data processor 460 then demodulates, deinterleaves, and decodes each detected symbol stream to recover the traffic data for the data stream. The processing performed by the RX data processor 460 is complementary to that performed by the TX MIMO processor 420 and the TX data processor 414 at the femto node 410.

A processor 470 may periodically determine a pre-coding matrix to use. The processor 470 may formulate a reverse link message comprising a matrix index portion and a rank value portion. A data memory 472 may store program code, data, and other information used by the processor 470 or other components of the user equipment 450.

The reverse link message may comprise various types of information regarding the communication link and/or the received data stream. The reverse link message is then processed by a TX data processor 438. The TX data processor 438 also receives traffic data for a number of data streams from a data source 436. The modulator 480 modulates the data streams. Further, the transceivers 454A through 454R condition the data streams and transmit the data streams back to the femto node 410.

At the femto node 410, the modulated signals from the user equipment 450 are received by the antennas 424. Further, the transceivers 422 condition the modulated signals. A demodulator ("DEMOD") 440 demodulates the modulated signals. A RX data processor 442 processes the demodulated signals and extracts the reverse link message transmitted by the user equipment 450. The processor 430 may then determine which pre-coding matrix to use for determining the beam-forming weights. Further, the processor 430 processes the extracted message.

Further, the femto node 410 and/or the user equipment 450 may comprise one or more components that perform interference control operations as taught herein. For example, an interference ("INTER") control component 490 may cooperate with the processor 430 and/or other components of the femto node 410 to send/receive signals to/from another device (e.g., the user equipment 450) as taught herein. Similarly, an interference control component 492 may cooperate with the processor 470 and/or other components of the user equipment 450 to send/receive signals to/from another device (e.g., the femto node 410). It should be appreciated that for each of the femto node 410 and the user equipment 450 the functionality of two or more of the described components may be provided by a single component. For example, a single processing component may provide the functionality of the interference control component 490 and the processor 430. Further, a single processing component may provide the functionality of the interference control component 492 and the processor 470.

Figure 5:
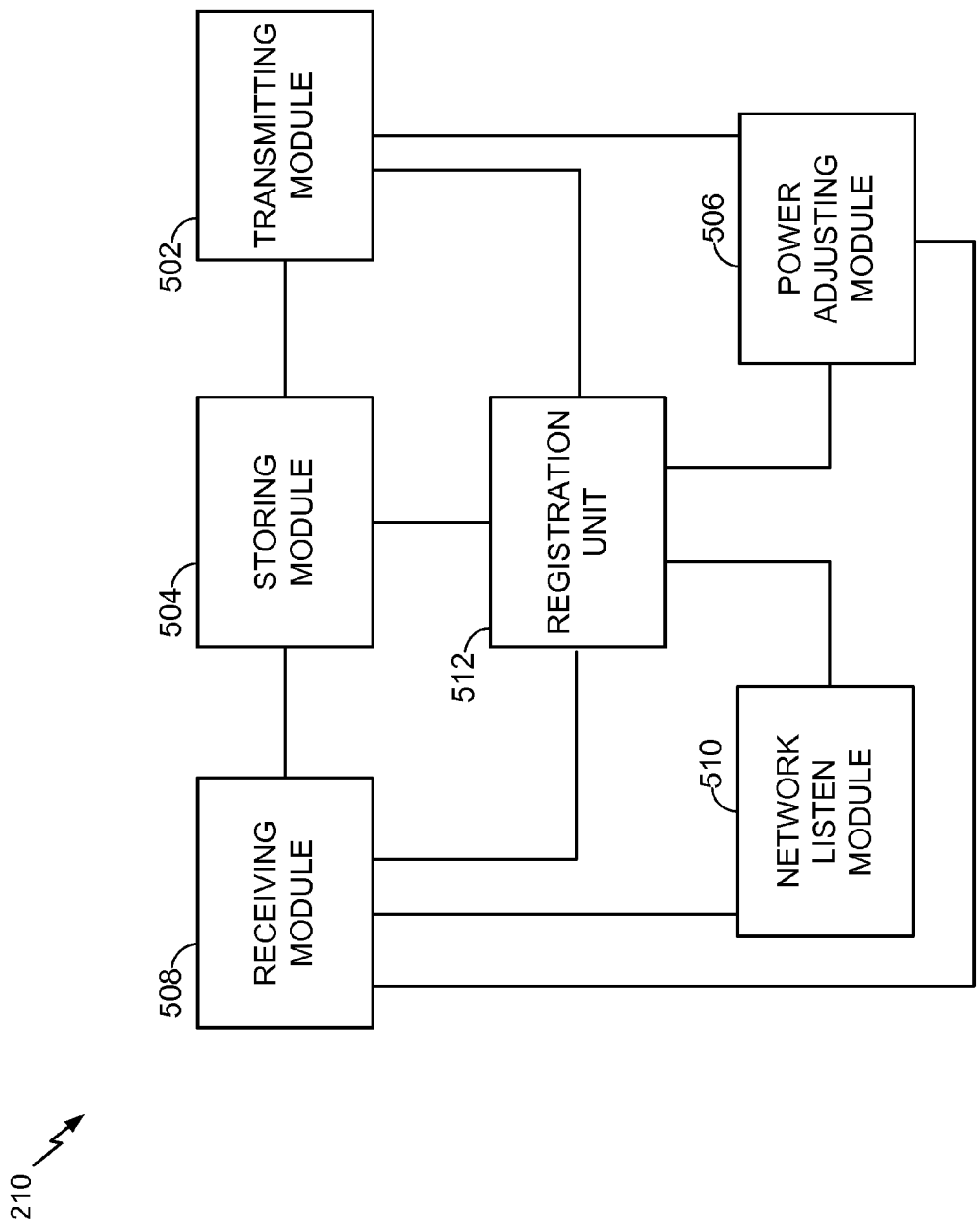
FIG. 5 is a functional block diagram of a second exemplary femto node in one of the communication networks of FIG. 2.

FIG. 5 is a functional block diagram of a second exemplary femto node 210 in one of the communication networks of FIG. 2. As described above, the femto node 210 may comprise an implementation of a node 104 described with respect to FIG. 1, may be implemented in the network 300 as described with respect to FIG. 3, and/or may be implemented according to the femto node 410 described with respect to FIG. 4. Although the following description will be made with respect to the femto node 210, those of skill in the art will understand that the femto node illustrated in FIGS. 5 and described with respect thereto may additionally or instead be implemented in the femto node 212.

The femto node 210 may comprise a transmitting module 502. The transmitting module 502 may be configured to transmit data to one or more user devices. For example, the transmitting module 502 may be configured to transmit data from the data source 412, data stored in a storing module 504, or some other source, to the user equipment 222. In some embodiments, the transmitting module 502 is configured to transmit data to another node, for example the femto node 212 and/or the macro node 205. The transmitting module 502 may be configured to transmit data wirelessly, for example as illustrated in FIG. 2, and/or over a wired network.

The transmitting module 502 may further be configured to broadcast a beacon or a pilot signal, for example as described above. The beacon or pilot signal may be broadcast over a plurality of channels, or may be broadcast over a dedicated channel, for example a common pilot channel (CPICH). The power with which the pilot, or any other communications such as user data or any other signals, is broadcast or transmitted may be determined and adjusted by a power adjusting unit 506 in communication with the transmitting module 502.

The transmitting module 502 may be implemented using one of or a combination of the transmitter portions of one or more of the transceivers 422A-422T, the TX data processor 414, the TX MIMO processor 420, and the processor 430. In some embodiments, the transmitting module 502 comprises an antenna and a transceiver. The transceiver may be configured to modulate outbound wireless messages going to the UE 222. The messages may be transmitted via the antenna, for example one or more of the antennas 424A-424T. The antenna may be configured to communicate with the UE 222 over one or more carriers and one or more channels. The wireless message may comprise voice and/or data-only information. In some embodiments, the transmitting module 502 is configured to transmit communications over a wired connection. The transmitting module 502 may further comprise a modem. The modem may be configured to modulate the outbound wired messages going to the network 240.

As discussed above, the storing module 504 may be configured to store data for transmission. The storing module 504 may also be configured to store other data or information, for example system parameters or control information. Stored data or information may comprise any combination of information, bits, symbols, or other data or representations. The storing module 506 may be implemented using the memory 432 described above with respect to FIG. 4. In some embodiments, the storing module 504 comprises a data buffer or a memory array, or other data structure, configured to store data. The storing module 504 may comprise a plurality of these elements as well. If the storing module 504 is configured to store data to transmit, the storing module 504 may receive the data from a number of sources. For example, the data may be generated by or received from the data source 412 and/or the processor 430 described with respect to FIG. 4, or may be derived in part from received information, for example as received using one or more of the transceivers 422A-422T.

The storing module 504 may comprise processing module cache, including a multi-level hierarchical cache in which different levels have different capacities and access speeds. The storing module 504 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

As discussed above, the power adjusting module 506 may be configured to adjust a power with which a signal is transmitted from the transmitting module 502. The power adjusting module 506 may be configured to adjust the power based at least in part on information received using a receiving module 508, for example information indicative of a measurement derived from reception of a signal transmitted using the transmitting module 502 or an associated statistic. The power adjusting module 506 may further be configured to adjust the power based on information determined by a network listen module 510.

In some embodiments, the power adjusting module 506 adjusts the power that is used to transmit a signal from the transmitting module 502 such that the signal may be properly received throughout the femto area 215. This may be determined based on, for example, information indicative of a path loss of the signal or of a strength of the signal. In some embodiments, the power adjusting module 506 further adjusts the power that is used to transmit the signal from the transmitting module 502 such that the signal does not interfere with a UE that receives communications from the macro node 205 and the femto node 212. Thus, the power adjusting module 506 may be configured to increase or decrease a power used to transmit a signal using the transmitting module 502 to increase the likelihood of the signal being received throughout the femto area 215 without interfering with the reception of signals at locations external to the femto area 215.

Those of skill in the art will appreciate various circuits, chips, modules, and/or components, which may comprise either software or hardware or both, that may be used to implement the power adjusting module 506. The power adjusting module 506 may be partially or wholly implemented in the processor 430 illustrated in FIG. 4.

The receiving module 508 may be configured to receive data from one or more

UEs. For example, the receiving module 508 may be configured to receive data from the UE 222 illustrated in FIG. 2. In some embodiments, a UE that is communicating via the femto node 210 may be referred to as a home user equipment (HUE), and a UE that is communicating via any femto node, for example the femto node 210 and/or the femto node 212, may be referred to as a femto user equipment. In some embodiments, the receiving module 506 is configured to receive a signal from another node, for example the femto node 212 and/or the macro node 205. In some embodiments, the receiving module 508 is configured to receive a statistic, for example from the femto node 212 and/or the macro node 205. The receiving module 508 may be configured to receive data wirelessly, for example as illustrated in FIG. 2, and/or over a wired network.

In one embodiment, the receiving module 508 is configured to receive a broadcast beacon or pilot signal. As described above, the beacon or pilot signal may be broadcast over a plurality of channels, or may be broadcast over a dedicated channel, for example a common pilot channel (CPICH). The receiving module 508 may be implemented using one of or a combination of the receiver portions of one or more of the transceivers 422A-422T, the demodulator 440, the RX data processor 442, and the processor 430. In some embodiments, the receiving module 508 comprises an antenna and a transceiver. The transceiver may be configured to demodulate inbound wireless messages coming from the UE 222. The messages may be received via the antenna. The antenna may be configured to communicate with the UE 222 over one or more carriers and one ore more channels. The wireless message may comprise voice and/or data-only information. The receiving module 508 may demodulate the data received. In some embodiments, the receiving module 508 is configured to receive communications over a wired connection. The receiving module 508 may further comprise a modem. The modem may be configured to demodulate the inbound wired messages coming from the network 240.

The network listen module 510 may be configured to measure signals received by the receiving module 508, or to detect a condition of a wireless network at the femto node 210. In some embodiments, the network listen module 510 is configured to identify a WCDMA, GSM, TD-SCDMA, or other network based on the received signals. In some embodiments, the network listen module 510 is referred to as a "sniffer." Those of skill in the art will appreciate various circuits, chips, modules, and/or components, which may comprise either software or hardware or both, that may be used to implement the network listen module 510. The network listen module 510 may be partially or wholly implemented in the processor 430 illustrated in FIG. 4.

In previously known systems, a receiver of a femto node would be configured to receive signals, for example beacon signals, from a macro node serving a macro area in which the femto node is located. In the network 200 illustrated in FIG. 2, the receiver would receive beacons transmitted by the macro node 205. These received beacons would be passed to a network listen module of the femto node, which would measure the strength of a pilot of the beacon. Using the measurements of the beacon transmitted from the macro node 205 and determined in the network listen module, a power for transmitting signals would be determined Thus, in known systems, the transmission power of the femto node would be adjusted to reduce interference based on signals received from a nearby macro node. These received signals would be interpreted by the femto node as being indicative of a network environment in which the femto node is operating. Those of skill in the art will appreciate that pilot signals may be received independent of a beacon signal. In some configurations of the network 200, both pilot signals and beacons are utilized. In other configurations of the network 200, only pilot signals are utilized.

Determining a transmission power from a beacon received from a macro node may, however, be insufficient in many situations. For example, when a femto node is placed near a window of a house in a previously known system, the network listen module may detect a higher interference at the window than exists inside the house. If a UE that the femto node communicates with is located inside the house, then the femto node would transmit signals with a power that is greater than necessary because the femto node would try to overcome the interference detected at the window. Transmitting with this unnecessarily high power may increase the area in which signals from the femto node are received. Increasing the area in this way may cause the signals from the femto node to leak outside of the intended coverage area inside the house and interfere with UEs that are not communicating with the femto node. Further, transmitting with this unnecessarily high power may decrease the available operating time of a femto node that is powered by a battery or another independent power source.

As another example, when a femto node is located in basement of a house in a previously known system, the network listen module may detect a lower interference in the basement than exists inside the remainder of the house. If a UE that the femto node communicates with is located at a distance from the basement, then the femto node would transmit signals with a power that is lower than required because the femto node would determine that the UE also experiences low interference. Transmitting with this reduced power will may decrease the area in which signals from the femto node are received, which may result in insufficient reception of signals transmitted from the femto node. In this situation, it may be possible for the femto node to transmit at a higher power to ensure proper reception while still maintaining a transmission power that does not adversely interfere with UEs that are not communicating with the femto node.

In some embodiments described herein, on the other hand, the femto node 210 is configured to receive, for example using the receiving module 508, information indicative of a measurement of a signal transmitted, for example using the transmitting module 502, from the femto node 210. This information may be received, for example, from a UE located in the femto area 215 such as the UE 222. The information may be used by the power adjusting module 506 to adjust the transmission power of the signal. In this way, the femto node 210 may utilize information from UEs receiving the signal in the femto area 215. In some embodiments, the femto node 210 may receive similar information from another femto node which receives and measures the signal, for example the femto node 212.

In some embodiments, information indicative of a measurement of a signal transmitted from the femto node 210 may be communicated to a remote femto node from a receiving UE. For example, when the UE 221 is located near the border of the femto area 217, in close proximity to the femto area 215, the UE 221 may detect a signal from the femto node 210 and transmit information indicative of a measurement of that signal to the femto node 212. The femto node 212 may then transmit the information directly to the femto node 210, for example over a wired or wireless link, or may transmit the information to the femto node 210 via the network 240 and/or the macro node 205. In one embodiment, the femto node 212 determines a statistic based on communications from a plurality of UEs regarding a signal transmitted by the femto node 210, and transmits the statistic to the femto node 210.

In some embodiments, information indicative of a measurement of a signal transmitted from the femto node 210 may similarly be communicated to a macro node from a receiving UE. For example, when the UE 220 is located in close proximity to the femto area 215, the UE 220 may detect a signal from the femto node 210 and transmit information indicative of a measurement of that signal to the macro node 205. The macro node 205 may similarly transmit the information to the femto node 210, for example directly or indirectly through the backhaul, and via a wired or wireless link. In one embodiment, the macro node 205 determines a statistic based on communications from a plurality of UEs regarding a signal transmitted by the femto node 210, and transmits the statistic to the femto node 210.

In some embodiments, information indicative of a measurement of a signal transmitted from the macro node 205 may be communicated to the femto node 210. This information may be transmitted from to the femto node 210 from a UE being served by the femto node 210. For example, when the UE 222 is near the periphery of the femto area 215, it may receive signals from the macro node 205 and communicate information indicative of a measurement of the signals to the femto node 210. The information may instead be transmitted to the macro node 205, for example by the UE 220 when the UE is near the periphery of the femto area 215, and communicated to the femto node 210 thereafter. This measurement of a signal of the macro node 205 may be used by the femto node 210 to more accurately determine network conditions, for example at the periphery of the femto area 215. Thus, the femto node 210 may be able to more accurately determine the environment throughout the femto area 215 instead of making assumptions based solely on measurements made in the network listen module 510.

Continuing to refer to FIG. 5, the femto node 210 may further comprise a registration unit 512. The registration unit 512 may comprise information identifying one or more UEs permitted to communicate using the femto node 210. In one embodiment, the UEs identified by information in the registration unit 512 comprise a CSG, as discussed above, or a Closed User Group (CUG). For a closed femto node, only UEs identified in the registration unit 512 are permitted to communicate with other UEs through use of the transmitting module 502 and the receiving module 508. Thus, although UEs in the macro area 230 and/or the femto area 217 may detect signals transmitted by the femto node 210 and may request registration with the femto node 210, these UEs will not be allowed to register with the femto node 210 unless they are identified in the registration unit 512.

In some embodiments, the registration unit 512 may be implemented as a portion of the storing module 504, or vice versa. In other embodiments, the registration unit 512 operates in conjunction with the storing module 504, for example identifying registered UEs based at least in part on information stored in the storing module 504. Information identifying the UEs in the registration module may comprise any combination of data, bits, symbols, or other information or representations. The registration unit 512 may be implemented using the memory 432 described above with respect to FIG. 4. In some embodiments, the registration unit 512 comprises a data buffer or a memory array, or other data structure, configured to store data. For example, the registration unit 512 may comprise a table storing a unique identifier or device ID for the registered UEs. The device ID may comprise any number of identifiers that may be used to identify an apparatus. For example, the device ID may comprise a serial number, a telephone number, a mobile identification number (MIN), an electronic serial number (ESN), an international mobile equipment identifier (IMEI), an international mobile subscriber identifier (IMSI), or any other identifier that may be used to identify an apparatus. The registration unit 512 may comprise a plurality of these elements as well.

The registration unit 512 may comprise processing module cache, including a multi-level hierarchical cache in which different levels have different capacities and access speeds. The registration unit 512 may also comprise random access memory (RAM), other volatile storage devices, or non-volatile storage devices, and/or processing circuitry configured to identify UEs or determine that a UE is not identified in the registration unit. For example, the registration unit 512 may comprise the processor 430 or a portion thereof. Storage in the registration unit 512 may include hard drives, optical discs, such as compact discs (CDs) or digital video discs (DVDs), flash memory, floppy discs, magnetic tape, and Zip drives.

In some embodiments, the femto node 210 is configured to adjust a transmission power based on unsuccessful registration attempts. For example, a request for registration may be received from a UE, for example by the receiving module 508. After determining that the UE is not registered with the femto node 210, for example by using the registration unit 512, the transmission power may be adjusted, for example by using the power adjusting module 506. In some embodiments, a power for transmitting a signal using the transmitting module 502 is adjusted by the power adjusting module 506 based on a plurality of received requests for registration from UEs not identified in the registration unit 512, or based on a statistic calculated therefrom. In some situations, the improper registration attempts are an indication of excessive interference, for example at a periphery of the femto area 215. As an example, if a number of UEs that are not registered with the femto node 210 request service from the femto node 210, then these UEs may be identifying the femto node 210 as the strongest transmission source and the femto node 210 may be transmitted with a power that is too great.

Figure 6:
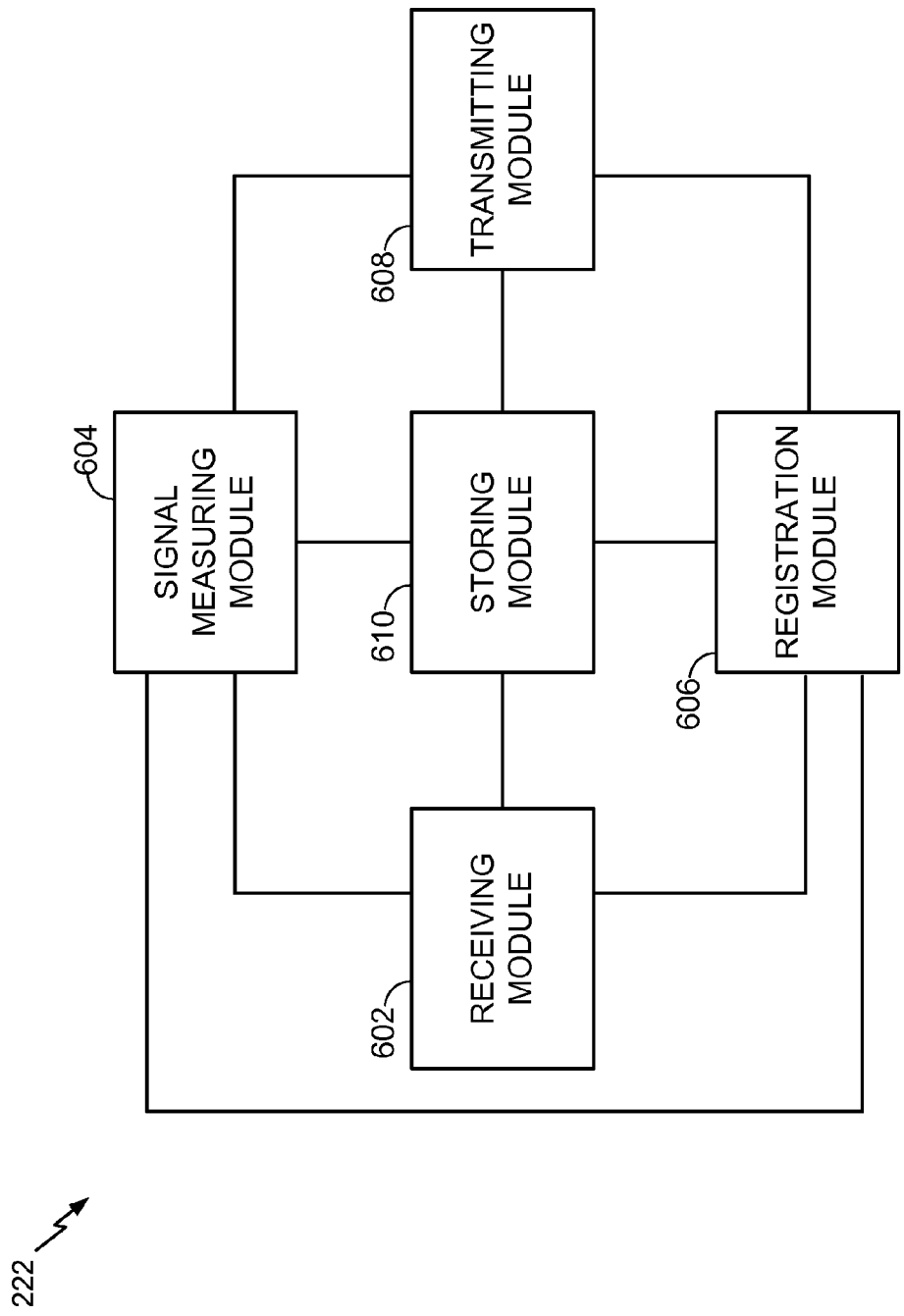
FIG. 6 is a functional block diagram of a second exemplary user equipment in one of the communication networks of FIG. 2.

FIG. 6 is a functional block diagram of a second exemplary user equipment 222 in one of the communication networks of FIG. 2. As described above, the UE 222 may comprise an implementation of a node 106 described with respect to FIG. 1, and/or may be implemented according to the UE 450 described with respect to FIG. 4. Although the following description will be made with respect to the UE 222, those of skill in the art will understand that the UE illustrated in FIG. 6 and described with respect thereto may additionally or instead be implemented in either or both of the UEs 220 and 221.

The UE 222 may comprise a receiving module 602. The receiving module may be configured to receive a signal from a femto node and/or a macro node. For example, the receiving module 602 may be configured to receive a signal from the femto node 210 and/or the macro node 205 illustrated in FIG. 2. The signal may comprise a beacon or pilot, as described above, or may comprise data being transmitted to the UE 222. As described above, the beacon or pilot signal may be received over a plurality of channels, or may be received over a dedicated channel, for example a common pilot channel (CPICH). Similarly, data may be received over one or more channels. The signal may comprise voice data when the UE is in an active call, for example. The receiving module 602 may be configured to receive data wirelessly, for example as illustrated in FIG. 2.

In one embodiment, the receiving module 602 is configured to receive a broadcast beacon or pilot signal. The receiving module 602 may be implemented using one of or a combination of the receiver portions of one or more of the transceivers 454A-454R, the RX data processor 460, and the processor 470. In some embodiments, the receiving module 602 comprises an antenna and a transceiver. The transceiver may be configured to demodulate inbound wireless messages coming from the femto node 210, the femto node 212, and/or the macro node 205. The messages may be received via the antenna. The antenna may be configured to communicate with the the femto node 210, the femto node 212, and/or the macro node 205 over one or more carriers and one ore more channels. The wireless message may comprise voice and/or data-only information. The receiving module 602 may demodulate the data received. In some embodiments, the receiving module 602 is configured to receive communications over a wired connection.

The UE 222 may further comprise a signal measuring module 604. The signal measuring module may be configured to compute a measurement of a received signal, for example using the receiving module 602. In some embodiments, the signal measuring module 604 is configured to determine a strength, interference, path loss, and/or seepage of the signal. For example, the signal measuring module may be configured to determine a received signal code power (RSCP) of the signal. In some embodiments, the signal measuring module 604 may be configured to compute a measurement for a pilot signal. For example, the signal measuring module 604 may be configured to compute an energy per chip versus total received power spectral density ($E_c/I_o$) of the pilot signal. Those of skill in the art will appreciate various circuits, chips, modules, and/or components, which may comprise either software or hardware or both, that may be used to implement the signal measuring module 604. The signal measuring module 604 may be partially or wholly implemented in the processor 470 illustrated in FIG. 4.

The UE 222 may further comprise a registration module 606. The registration module may be configured to generate requests to communicate via a node or register with that node, for example the femto node 210. The requests may be transmitted by a transmitting module 608. The registration module 606 may be configured to generate a registration request when a hand-off is desired or when requesting service for the first time after the UE 222 is powered on. In some embodiments, the registration module 606 determines a node from which to request registration based on a measurement from the signal measuring module 604. For example, if signals from several nodes are received by the receiving module 602, the registration module 606 may determine that the UE 222 should communicate via whichever node transmitted the signal that was received with the highest signal to noise ratio (SNR). If the UE 222 is not currently communicating via the node transmitted the signal that was received with the highest SNR, then the registration module 606 may generate a request to register with that node. This identification of a higher SNR may comprise a handoff condition, which handoff condition was discussed above. Information indicative of a measurement of the signal from the signal measuring module 604 may be transmitted with the request.

In some embodiments, the registration module 606 is configured to generate a request to register with a node only if the registration module 606 can identify that the UE 222 is allowed to communicate via that node. In some embodiments, the UE 222 may be configured to store a set of allowed nodes, for example in a storing module 610, and the registration module 606 may be configured to request registration with a node only if it can be identified as a node in the set of allowed nodes. For example, the set of allowed nodes may include femto node 210 and all macro nodes. If the UE 222 is first located in the macro area 230 and later enters the femto area 210, the registration module 606 may identify a signal from the femto node 210 and attempt to register with the femto area 210. As another example, the femto node 212 may be a closed femto node, and the UE 222 may not be part of the CSG for the femto node 212. If the UE 222 were to move from the femto area 215 to the femto area 217, the registration module 606 may refrain from requesting to communicate via the femto node 212 even if the receiving module 602 receives pilot signals from the femto node 212.

In some embodiments, the registration module 606 may be configured to generate an interference communication to transmit to a node, for example using the transmitting module 608, when an interference condition is detected. The interference condition may be determined based on a measurement from the signal measuring module 604. For example, an interference condition may be identified when a path loss of a pilot signal from a home node of the UE 222 is above a threshold because of interference from a signal being transmitted by another node. The interference communication may comprise an over-the-air (OTA) message addressed to the interfering node. In some embodiments, this communication is only generated and/or transmitted when the registration module 606 identifies that the UE 222 is not allowed to communicate via the interfering node. The interference communication may be sent using a random access channel (RACH) procedure, and may include an $E_c/I_o$ or RSCP for a signal received from the interfering node. Those of skill in the art will appreciate that if the UE 222 is allowed to communicate via the interfering node, then the UE 222 may simply register with the interfering node and transmit an interference measure to the interfering mode during communication with the node. When the UE 222 is not allowed to communicate with the interfering node, however, a special interference communication could be sent to the interfering node without the expectation that the interfering node would acknowledge the communication or otherwise direct communication to the UE 222.

The registration module 606 may identify and distinguish between different networks using any number of methods or techniques. In some embodiments, each pilot signal comprises a physical layer identifier, such as an offset pseudo noise (PN) short code, which may be used to identify which node transmitted the pilot. In other embodiments, nodes may be identified by a location area code (LAC). For example, each femto node in the network 200 may be identified by a unique LAC. Macro nodes may additionally be identified by unique LACs, or in some embodiments may share a LAC with one or more other macro nodes. Those of skill in the art will appreciate other methods or techniques that may be used to identify a transmitting node or a network of a transmitting node.

In some embodiments, in order to determine whether or not the UE 222 is allowed to access a femto node, the registration module 606 may read L3 overhead messages such as system information broadcasts (SIBs) of the femto node. These L3 overhead messages may be periodically broadcast by the femto node and may be received using the receiving module 602. The system information may include identity information such as a CSG ID and/or a cell ID, which uniquely identify the femto node. The system information may further include an indicator of the access mode of the femto node (e.g., closed, open, or hybrid). Accordingly, the registration module 606 can determine whether it can access the femto node and also how to uniquely identify the femto node. For example, this information may be used in combination with a stored set of allowed femto nodes or allowed cells.

Those of skill in the art will appreciate various circuits, chips, modules, and/or components, which may comprise either software or hardware or both, that may be used to implement the registration module 606. The registration module 606 may be partially or wholly implemented in the processor 470 illustrated in FIG. 4.

As described above, the transmitting module 608 may be configured to transmit messages or communications, for example to a node such as the femto node 210 and/or the macro node 205. As described above, the transmitting module 608 may be configured to transmit request for registration to a node and/or an interference communication. The transmitting module 608 may further be configured to transmit a measurement from the signal measuring module 604 or information indicative thereof. In some embodiments, the transmitting module may be configured to transmit data, and may be configured to transmit communications to another UE. The transmitting module 608 may be configured to transmit information from the signal measuring module 604, communications from the registration module 606, data stored in the storing module 610, data from the data source 436, or some other source. The transmitting module 606 may be configured to transmit data wirelessly, for example as illustrated in FIG. 2.

The transmitting module 606 may be implemented using one of or a combination of the transmitter portions of one or more of the transceivers 454A-454R, the modulator 480, the TX data processor 438, and the processor 470. In some embodiments, the transmitting module 606 comprises an antenna and a transceiver. The transceiver may be configured to modulate outbound wireless messages going to the macro node 205, femto node 210, and/or femto node 212. The messages may be transmitted via the antenna, for example one or more of the antennas 452A-452R. The antenna may be configured to communicate with the macro node 205, femto node 210, and/or femto node 212 over one or more carriers and one or more channels. The wireless messages may comprise voice and/or data-only information.

As described above, the storing module 610 may be configured to store data for transmission, for example using the transmitting module 608. The storing module 610 may also be configured to store other data or information, for example information for identifying transmitting nodes or information regarding a set of nodes which the UE 222 is allowed to register with or for identifying preferred nodes. In one embodiment, information for identifying a CSG to which the UE 222 belongs is stored in a table in the storing module 610. Stored data or information may comprise any combination of information, bits, symbols, or other data or representations. The storing module may be implemented using the memory 472 described above with respect to FIG. 4. In some embodiments, the storing module 610 comprises a data buffer or a memory array, or other data structure, configured to store data or information. The storing module 610 may comprise a plurality of these elements as well.

The storing module 610 may comprise processing module cache, including a multi-level hierarchical cache in which different levels have different capacities and access speeds. The storing module 610 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

Figure 7:
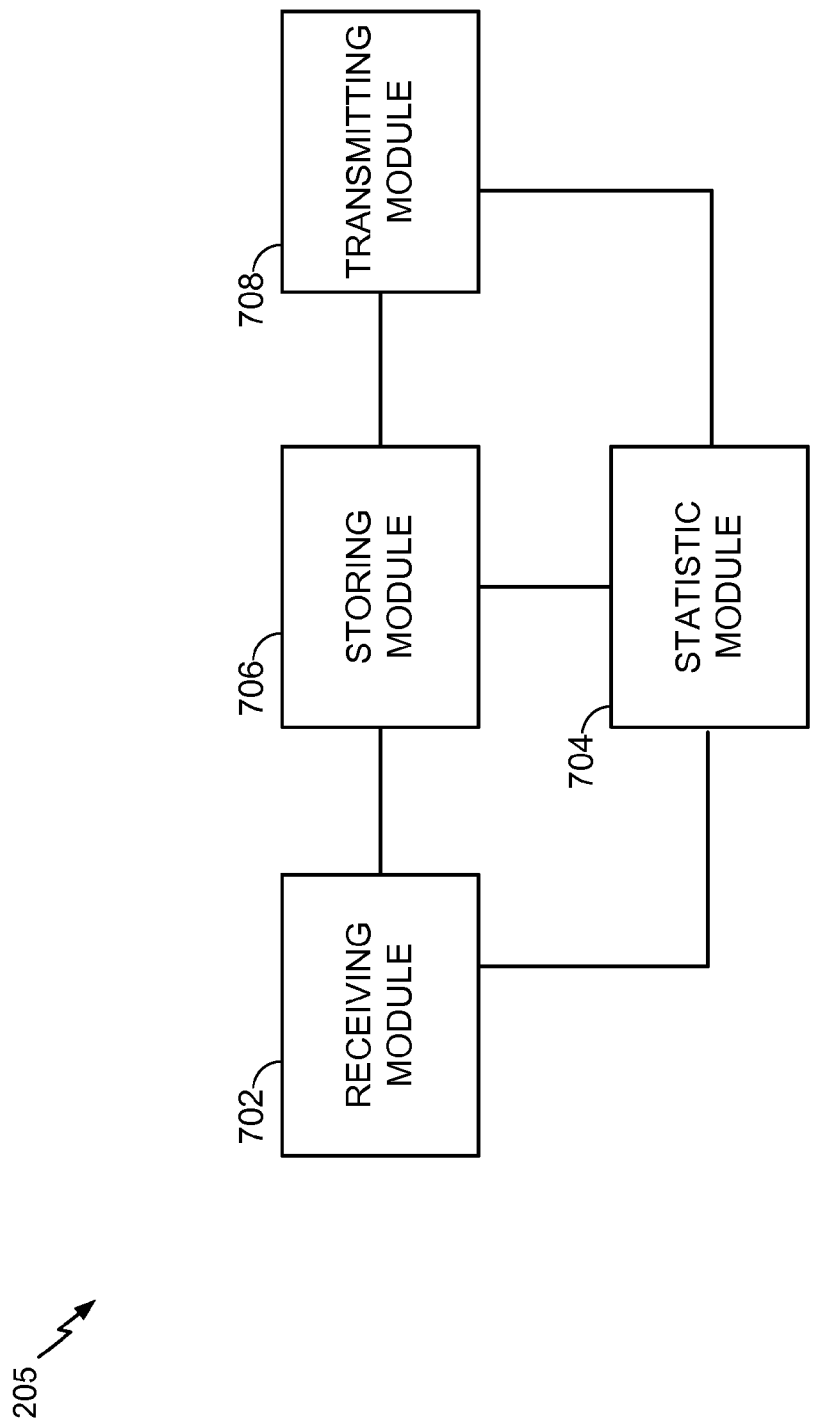
FIG. 7 is a functional block diagram of an exemplary macro node in one of the communication networks of FIG. 2.

FIG. 7 a functional block diagram of an exemplary macro node 205 in one of the communication networks of FIG. 2. As described above, the macro node 210 may comprise an implementation of a node 104 described with respect to FIG. 1, and/or may be implemented in the network 300 as described with respect to FIG. 3. In some embodiments, the macro node 205 may be implemented using components similar to those described with respect to the femto node 410 illustrated in FIG. 4.

The macro node 205 may comprise a receiving module 702. The receiving module 702 may be configured to receive data from one or more UEs. For example, the receiving module 702 may be configured to receive data from the UE 220 illustrated in FIG. 2. In some embodiments, a UE that is in communication with the macro node 205 is referred to as a macro user equipment (MUE). The receiving module 702 may be configured to receive information from the UE 220 indicative of a measurement of a signal received by the UE 220. For example, the information may include a measurement of a quality of a pilot signal received by the UE 220 from the femto node 210. The measurement may include any signal measurement discussed above, for example when discussing the signal measuring module 604 illustrated in FIG. 6. The receiving module 702 may be configured to receive data wirelessly, for example as illustrated in FIG. 2, and/or over a wired network. In some embodiments, the receiving module 702 is configured to receive communications from a femto node, for example the femto node 210 and/or 212, either directly or through the backhaul or the network 240.

The receiving module 702 may be implemented using one of or a combination of elements similar to the the receiver portions of one or more of the transceivers 422A-422T, the demodulator 440, the RX data processor 442, and the processor 430. In some embodiments, the receiving module 702 comprises an antenna and a transceiver. The transceiver may be configured to demodulate inbound wireless messages coming from the UE 220. The messages may be received via the antenna. The antenna may be configured to communicate with the UE 220 over one or more carriers and one ore more channels. The wireless message may comprise voice and/or data-only information. The receiving module 702 may demodulate the data received. The receiving module 702 may further comprise a modem. The modem may be configured to demodulate inbound wired messages coming from the network 240.

The macro node 205 may further comprise a statistic module 704. The statistic module 704 may be configured to calculate or determine a statistic from information received via the receiving module 702. For example, when the receiving module 702 receives a plurality of communications regarding a measurement of a received signal, the statistic module 704 may calculate an average measurement. In some embodiments, the statistic module 704 is configured to determine a number of different devices from which the receiving module 702 received a measurement. For example, if the receiving module 702 received two measurements from the UE 220 and three measurements from the UE 221 regarding reception of a signal from the femto node, the receiving module 702 may determine that a measurement was received from two unique UEs. Information for determining the statistic may be stored in a storing module 706. The statistic module 704 may be configured to aggregate information from a plurality of communications. For example, a list of all measurements received by the receiving module 702 over a certain time period may be aggregated by the statistic module 704. Although the following description will refer to a statistic calculated by the statistic module 704, those of skill in the art will appreciate that the following description may also apply to an aggregate of data collected by the statistic module 704.

An average measurement, or other statistic, may be calculated at regular intervals or for specific periods of time. For example, the statistic module 704 may be configured to determine the mode of an SNR indicated by all measurements received within the past hour. This measurement may be calculated every hour, for example, or may be calculated on occurrence of an identified event. For example, the statistic module 704 may calculate an average signal quality from all measurements received within a specified time frame upon receipt of a request, for example from a node transmitting the signal on which the measurements are based. The request may in some embodiments comprise the specified time frame. As another example, the statistic module 704 may determine when the number of received measurements has exceeded a threshold, and may then calculate a statistic such as an average or a maximum measurement from those received measurements.

In some embodiments, the statistic module 704 is configured to maintain information, for example in the storing module 706, regarding several other nodes. For example, the receiving module 702 may receive information indicative of measurements calculated from signals transmitted from both the femto node 210 and the femto node 212. The statistic module 704 may be configured to distinguish between measurements made for signals from each of these femto nodes, and to determine a statistic for each node individually. Those of skill in the art will recognize that the statistic module 704 may in some embodiments be configured to calculate a statistic for several nodes in the aggregate as well, for example for the femto node 210 and the macro node 205.

In some embodiments, measurements that do not satisfy a predetermined condition are not considered when calculating the statistic. For example, the statistic module 704 may be configured to determine a number of devices that received a signal from the femto node 210 with an $E_c/I_o$ above a certain threshold. Measurements indicating an $E_c/I_o$ below this threshold may be ignored by the statistic module 704. Similarly, a statistic could be calculated from all measurements indicating an SNR below a given threshold.

In some embodiments, the statistic module 704 may be configured to determine a distribution. For example, the statistic module 704 may be configured to determine a number of unique devices that received a signal from femto node 210 having an RSCP in each of a plurality of ranges. Thus, the statistic module 704 might determine that three devices reported receiving the signal with an RSCP of −100 dBm to −90 dBm, six devices reported receiving the signal with an RSCP of −90 dBm to −80 dBm, and one device reported receiving the signal with an RSCP of −80 dBm to −70 dBm. In some embodiments, the statistic module 704 is configured to distinguish between the types of devices from which a measurement is received by the receiving module 702. For example, in the distribution discussed above, the statistic module 704 may determine that the six devices which received the signal with an RSCP of −90 dBm to −80 dBm consisted of two femto nodes and four UEs. The statistic module 704 may be configured to distinguish between devices using any number of methods or techniques, for example by correlating a device ID with a table of known device types.

Those of skill in the art will appreciate various circuits, chips, modules, and/or components, which may comprise either software or hardware or both, that may be used to implement the statistic module 704. The statistic module 704 may be partially or wholly implemented in elements similar to the processor 430 illustrated in FIG. 4.

As described above, the storing module 706 may be configured to store information received using the receiving module 702 and/or used by the statistic module 704 to calculate or determine a statistic. The storing module 706 may further be configured to store data for transmission, for example using a transmitting module 708. The storing module 708 may also be configured to store other data or information, as will be understood by those of skill in the art. The storing module may be implemented using elements similar to the memory 432 described above with respect to FIG. 4. In some embodiments, the storing module 706 comprises a data buffer or a memory array, or other data structure, configured to store data or information. The storing module 706 may comprise a plurality of these elements as well.

The storing module 706 may comprise processing module cache, including a multi-level hierarchical cache in which different levels have different capacities and access speeds. The storing module 706 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

As described above, the transmitting module 708 may be configured to transmit data, for example to the UE 220. The transmitting module 708 may also be configured to transmit a statistic determined by the statistic module 704 or information indicative thereof, for example to a femto node such as the femto node 210. In some embodiments, the transmitting module 708 is configured to transmit messages over a wireless link, for example to the UE 220. In some embodiments, the transmitting module 708 is configured to transmit messages over a wired link, for example to the network 240. Messages may be communicated, for example when being transmitted to a femto node such as the femto node 210, via an RNC, and/or using a RANAP protocol. In one embodiment, messages are communicated over the backhaul utilizing a RIM procedure. In some previously known systems, there exist radio access network (RAN) mechanisms for communicating information between a Global System for Mobile Communications (GSM) network and a Universal Mobile Telecommunications System (UMTS) network. In some embodiments discussed herein, however, RAN mechanisms for communicating between two UMTS networks are described.

The transmitting module 708 may be implemented using one of or a combination of elements similar to the transmitter portions of one or more of the transceivers 422A-422T, the TX data processor 414, the TX MIMO processor 420, and the processor 430. In some embodiments, the transmitting module 708 comprises an antenna and a transceiver. The transceiver may be configured to modulate outbound wireless messages going to the UE 220 or to the femto node 210. The messages may be transmitted via the antenna, for example antennas similar to one or more of the antennas 424A-424T. The antenna may be configured to communicate with the UE 220 or the femto node 210 over one or more carriers and one or more channels. The wireless message may comprise voice and/or data-only information. The transmitting module 708 may further comprise a modem. The modem may be configured to modulate outbound wired messages going to the network 240.

Figure 8:
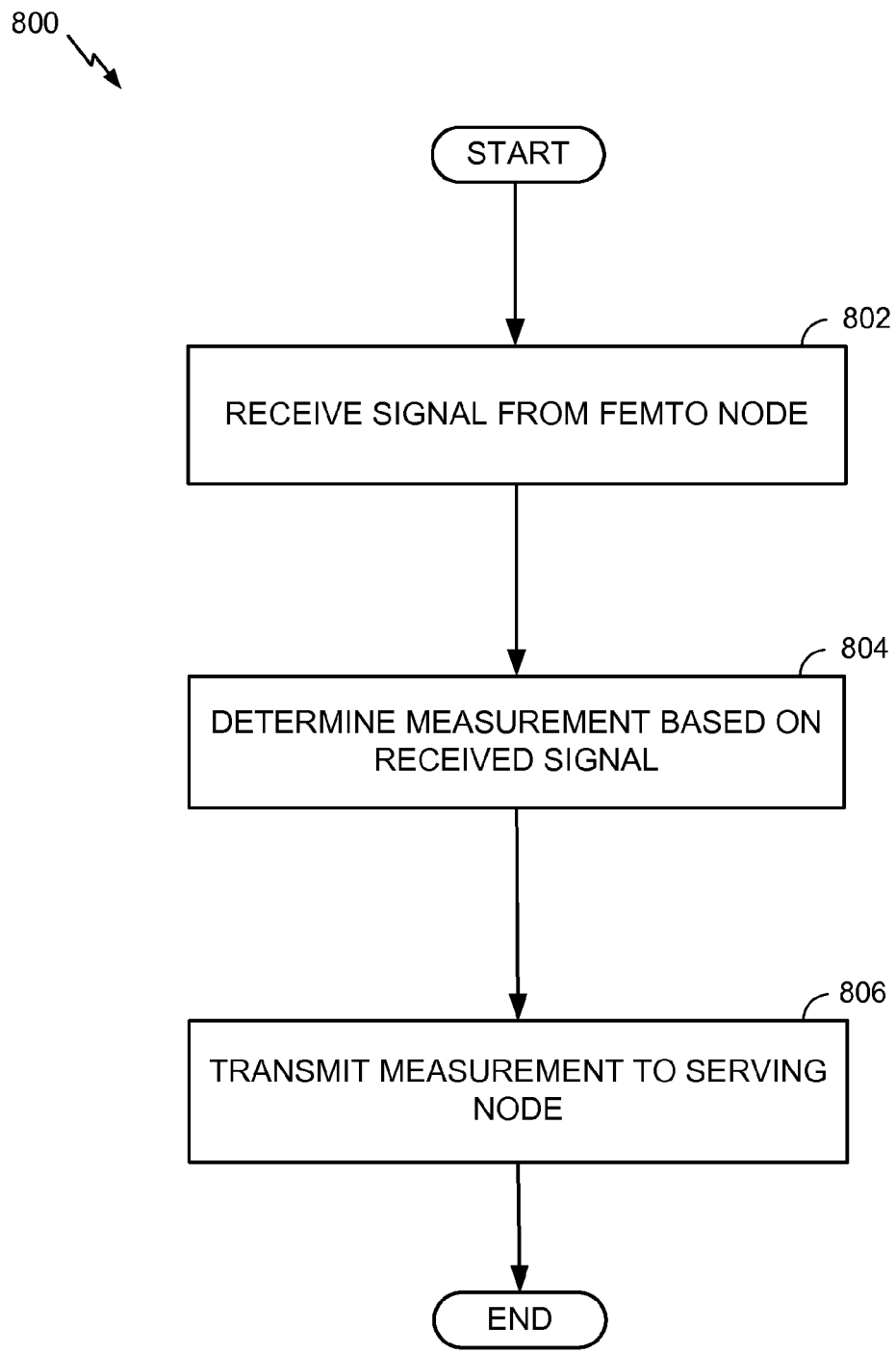
FIG. 8 is a flow chart illustrating an exemplary process of communication for a user equipment.

FIG. 8 illustrates an exemplary method 800 of communication for a user equipment, for example the UE 222. Although the method 800 will be described below with respect to elements of the UE 222, those of skill in the art will appreciate that other components may be used to implement one or more of the steps described herein, and that the method 800 may be practiced by other devices.

At step 802, a signal is received from a femto node. For example, the receiving module 602 may receive a pilot signal or data communication from the femto node 210. The signal may be wirelessly received, and may be directed to the UE 222 or may be directed to another device and seen by the UE.

At step 804, a measurement is calculated, for example by the signal measuring module 604, based at least in part on the signal received at step 804. The measurement may be any measurement as discussed above. For example, the measurement may comprise a PSMR, or an $E_c/I_o$ or a pilot received at step 804. The measurement may be indicative of a general signal quality or strength, or of a path loss of the received signal. The measurement may include an SNR of the received signal or information indicative of seepage or fading of the signal. Those of skill in the art will appreciate other measurements that may be calculated at step 804.

In some embodiments, the UE 222 calculates a statistic at step 804. The statistic may be similar to the statistic described above with respect to FIG. 7. For example, the signal measuring module 604 may be configured to calculate an average measurement from a plurality of signals received from the femto node 210 at the receiving module 602. Those of skill in the art will appreciate other statistics that may be calculated at step 804.

Continuing to step 806, information indicative of the measurement determined at step 804 is transmitted to a serving node of the UE 222. The serving node, which the UE 222 uses to communicate with other devices, may be the same as the femto node from which the UE 222 received the signal at step 802, or may be a different node. For example, the UE 222 is illustrated in FIG. 2 as being located within the femto area 215. While in the femto area 215, the UE 222 may be communicating with the UE 221 by using the femto node 210 as the serving node. The UE 222 may receive a pilot signal from the femto node 210 at step 802, determine a measurement of the pilot at step 804, and transmit the information indicative of the measurement back to the femto node 210 at step 806.

As another example, there may be a situation where the UE 220 is located near the femto area 215. Although the UE 220 is using the macro node 205 to communicate with other devices, the UE 220 may detect or receive a signal from the femto node 210. This may be referred to as "seeing" the femto node 210. At step 804, the UE 220 calculates a measurement of the signal from the femto node 210, and at step 806 the UE 220 transmits information indicative of the measurement to the macro node 205. Similarly, when the UE 221 is located near the femto area 215, the UE 221 may receive a pilot signal broadcast by the femto node 210 even though the UE 221 is in active communication with the femto node 212. The UE 221 may determine a measurement of the received pilot signal, and transmit that measurement to the femto node 212.

The measurement or information indicative thereof may be wirelessly transmitted to the serving node at step 806. Further, the information may be transmitted in any number of ways or using any number of techniques. For example, the UE 222 may transmit an MRM having the information therein.

The determination of the measurement at step 804 and/or the transmission at step 806 may be performed at any number of times, or may be triggered in any number of ways. For example, information may be transmitted at step 806 only when the measurement determined at step 804 is above a certain threshold. In some embodiments, information may be transmitted at step 806 only when signals received from the femto node 210 are below a threshold for a predetermined number of times in a row. For example, if the UE 222 receives three pilot signals in a row from the femto node 210 having an SNR below the threshold, the UE 222 may determine the lowest SNR or another statistic and transmit it to the femto node 210.

In another embodiment, the measurement could be determined at step 804 and/or transmitted at step 806 at regular intervals. In some embodiments, the determination of the measurement and/or the transmission are triggered by a predetermined event. For example, the measurement may be determined at step 804 and transmitted at step 806 in response to a request received from the femto node 210. In some embodiments, steps 804 and 806 are performed when the UE 222 hands off from one node to another. In this situation, the UE 222 could send a measurement to a node either immediately before handoff, or immediately after. The measurement could be for a signal received from the old serving node or for the new serving node. In some embodiments, information indicative of the measurement is transmitted at step 806 when the UE 222 sees a femto node which is not currently serving the UE 222.

Those of skill in the art will recognize that the method 800 may be performed by the UE 222 when in an active mode, for example while in a call or while communicating user data. Thus, information may be transmitted at step 806 in conjunction with active transmission of other. Those of skill in the art, however, will appreciate that in some embodiments the method 800 may be performed while in a passive mode.

Those of skill in the art will similarly recognize that the method 800 may be used to receive a signal from a macro node at step 802, for example using the receiving module 602 to receive a signal from the macro node 205. At step 804, a measurement of the signal may be determined, for example by the signal measuring module 604, and the measurement transmitted at step 806, for example by the transmitting module 608. The measurement may be transmitted to the femto node 210 by the UE 222, for example, or may be relayed to the femto node 210, for example by the macro node 205 when the UE 220 transmits the measurement. In one embodiment, measurements from a macro node are transmitted to the femto node when the UE hands off to the femto node from the macro node. In other embodiments, the femto node may request macro node measurements, for example from a UE that can see both the femto node and the macro node, or from the macro node itself. Those of skill in the art will recognize other situations in which a macro node measurement may be transmitted to the femto node, for example at a determined interval or when the macro node determines it would be advantageous.

The method 800 may be performed similarly by devices other than the UE 222. For example, a neighboring femto node may perform the method 800 similar to how the UE 222 performs the method 800. In one embodiment, the method 800 is implemented by the femto node 212. At step 802, the femto node 212 receives a signal from the femto node 210, for example using the receiving module 508. At step 804, the femto node 212 determines a measurement of the received signal. The femto node 212 may use the network listen module 510 to perform step 804, or the femto node 212 may comprise a module similar to the signal measuring module 604 described with respect to the UE 222. At step 806, the femto node 212 may transmit information indicative of the measurement to the femto node 210, for example using the transmitting module 502. In some embodiments, the transmission is directly to the femto node 210 via a wireless link. In some embodiments, the information is transmitted to a macro node, for example the macro node 205, for transmission to the femto node 210. Those of skill in the art will appreciate that some embodiments of the macro node 205 may similarly be used to communicate information indicative of a measurement to the femto node 210.

Figure 9:
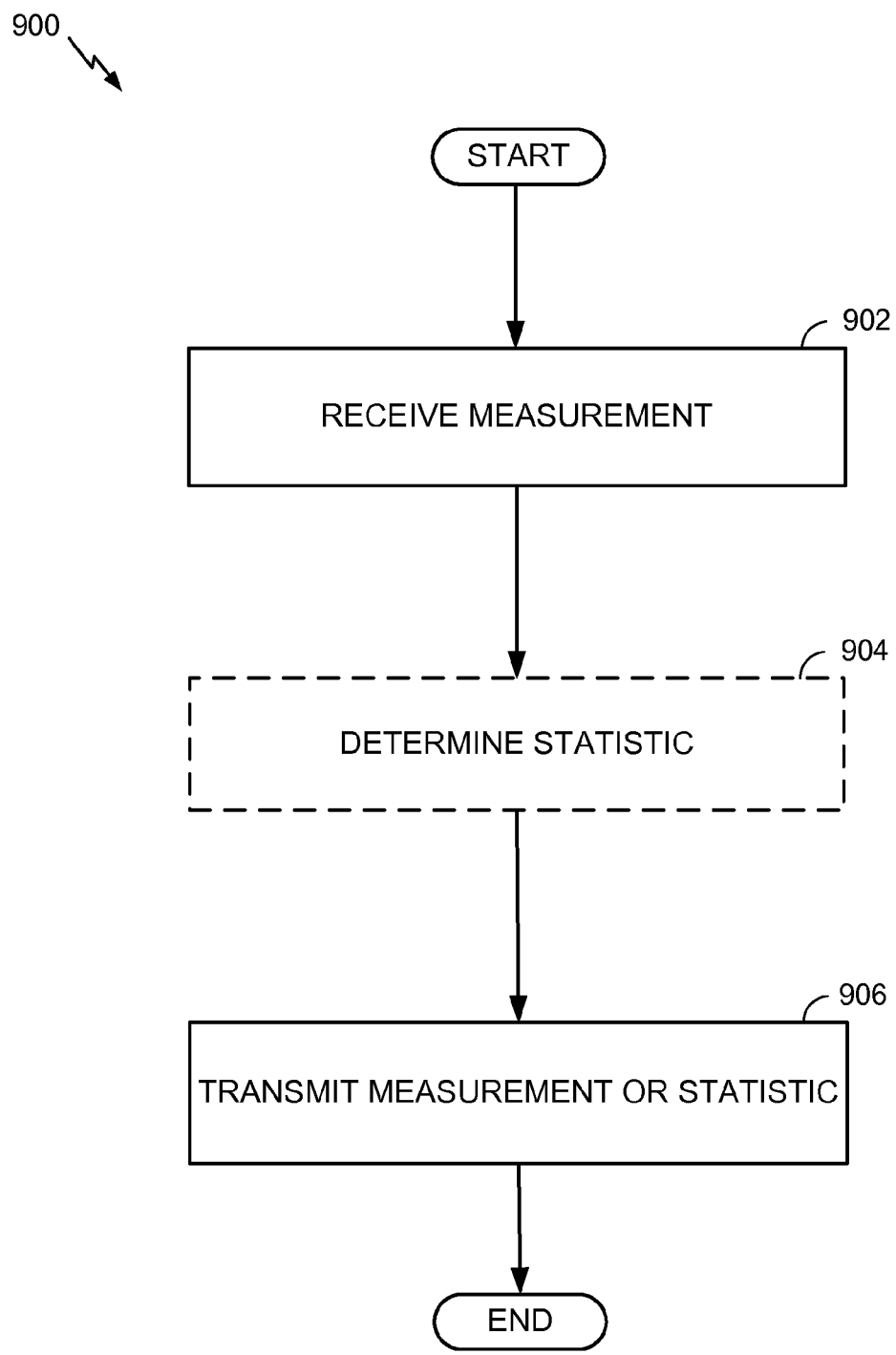
FIG. 9 is a flow chart illustrating an exemplary process of communication for a node.

FIG. 9 illustrates an exemplary method 900 of communication for a node, for example the macro node 205. Although the method 900 will be described below with respect to elements of the macro node 205, those of skill in the art will appreciate that other components may be used to implement one or more of the steps described herein, and that the method 900 may be practiced by other devices.

At step 902, a measurement or information indicative thereof is received, for example using the receiving module 702. The measurement or information may be received from a UE, for example the UE 220, or from another node, for example the femto node 212. The measurement or information may be received directly from another device, for example via a wireless link, or may be received through the network 240, for example through the backhaul.

At step 904, a statistic may be calculated, for example by the statistic module 704, if a plurality of measurements have been received. The statistic may comprise any of the statistics discussed above with respect to FIG. 7, and may be calculated using any of the methods or techniques described therein. For example, the statistic may be calculated as an average, a mode, a count or quantity, or a distribution. The statistic may be an ongoing calculation utilizing the current measurement received at step 904 and past measurements, or the statistic may be limited to a certain period of time. The period of time may be established beforehand as a default period, or the period of time may be periodically set or reset, for example by a request received from the femto node 210. Those of skill in the art will appreciate other statistics that may be calculated and other techniques that may be used to determine the statistic at step 904.

At step 906, at least a portion of the information indicative of the measurement or of the statistic is transmitted to a femto node associated with the measurement. For example, if the macro node 205 received a measurement at 902 of a signal transmitted by the femto node 210, then the macro node 205 would transmit the measurement or a statistic derived from the measurement to the femto node 210 at step 906. In some embodiments, a node identifier or cell ID is received with the measurement at step 902. This information may be used to identify which femto node transmitted the signal which the measurement pertains to. The identifying information may contain data identifying a pilot signal or PN sequence that may be use to identify the appropriate femto node or cell. Those of skill in the art will appreciate various identifiers and techniques of identifying a femto node or cell. In some embodiments, both the measurement received at step 902 and the statistic determined at step 904 are transmitted to the femto node at step 906.

Information indicative of the measurement or statistic may be transmitted to the femto node at step 906 in any number of ways. For example, as described above, the transmission may be directly to the femto node, for example over a wireless channel. In one embodiment, the macro node 205 transmits information indicative of the measurement or statistic wirelessly to the femto node 210. In other embodiments, the transmission may be routed via an RNC, and/or using a RANAP protocol, as described above. In one embodiment, information indicative of the measurement or statistic is communicated over the backhaul utilizing a RIM procedure.

The determining of the statistic at step 904 and/or the transmitting at step 906 may be performed under a variety of situations. Measurements received at step 902, for example, may be individually forwarded to a femto node as soon as they are received, or a plurality of the measurements may be gathered and forwarded to the femto node.

In some embodiments, the determining of the statistic at step 904 and/or the transmitting at step 906 are performed at specific times or time intervals. For example, the macro node 205 may collect all measurements received during a day and store them in the storing module 706. At a predetermined time each day, for example during a control communication time or device update time at the end of the day or early in the morning, the macro node 205 may forward all of the measurements received that day or may forward a statistic calculated therefrom. In other embodiments, the macro node 205 may calculate a statistic from all measurements received in the past six hours at step 904, and transmit that statistic at step 906.

In some embodiments, the determining of the statistic at step 904 and/or the transmitting at step 906 are event driven. For example, the statistic may be determined at step 904 and subsequently transmitted to a femto node at step 906 in response to a request from the femto node. In some embodiments, a statistic calculated at step 904 is only transmitted to the femto node when the measurement exceeds a predetermined threshold. Those of skill in the art will appreciate other events that may trigger the determining of the statistic at step 904 and/or the transmission at step 906, or times other than those described above, or techniques other than those described herein.

Those of skill in the art will recognize that the method 900 may be used to forward information indicative of a measurement of a signal from a macro node, for example the macro node 205. For example, information indicative of a measurement of the signal may be received at step 902, for example from the UE 220 using the receiving module 702. At step 906, at least a portion of the information may be communicated to the femto node 210, for example using the transmitting module 708.

The method 900 may be performed similarly by devices other than the macro node 205. For example, a neighboring femto node may perform the method 900 similar to how the macro node 205 performs the method 900. In one embodiment, the method 900 is implemented by the femto node 212. At step 902, the femto node 212 receives a measurement or information indicative thereof from another device, for example from the UE 221, for example using the receiving module 508. At step 904, the femto node may determine a statistic from the received measurement or information. In this embodiment, the femto node 212 may comprise a module similar to the statistic module 704 described with respect to the macro node 205. At step 906, the femto node 212 transmits information indicative of the measurement or the statistic to the femto node 210, for example. The information indicative of the measurement or the statistic may be transmitted with the transmitting module 502. In some embodiments, the transmission is directly to the femto node 210 via a wireless link. In some embodiments, the information is transmitted to a macro node, for example the macro node 205, for transmission to the femto node 210. Thus, the method 900 may be used by a plurality of nodes or devices to receive and forward a measurement until that measurement is received by the femto node corresponding to the measurement. In some embodiments, the measurement is forwarded between femto nodes and/or macro nodes until reaching its destination in a fashion that is similar to how packets are forwarded in an internet protocol (IP) network. The measurements may also be forwarded to or from a UE.

Figure 10:
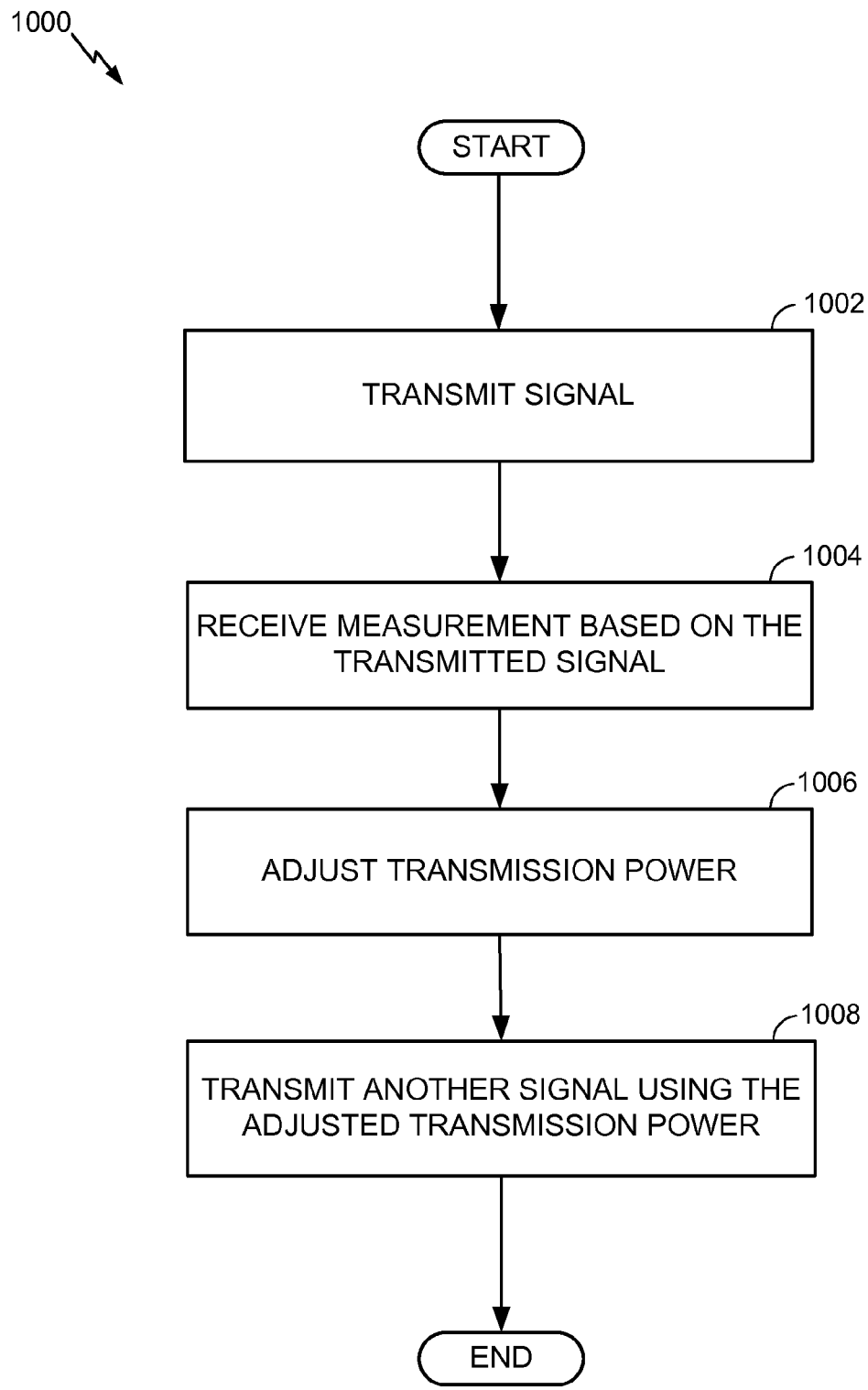
FIG. 10 is a flow chart illustrating an exemplary process of adjusting a transmission power for a femto node.

FIG. 10 illustrates an exemplary method 1000 of adjusting a transmission power for a femto node, for example the femto node 210. Although the method 900 will be described below with respect to elements of the femto node 210, those of skill in the art will appreciate that other components may be used to implement one or more of the steps described herein, and that the method 900 may be practiced by other devices.

At step 1002, a signal is transmitted, for example using the transmitting module 502. As described above, the signal may comprise a pilot signal, and may be transmitted over one or more channels. For example, the signal may be a pilot signal transmitted over a CPICH. In some embodiment, the signal encodes user or voice data.

At step 1004, a measurement of the signal or information indicative of a measurement is received, for example by the receiving module 508. The measurement of information indicative thereof may be wirelessly received from a UE or node, for example the UE 222 or the femto node 212 or the macro node 205. In some embodiments, the measurement or information thereof is received over a wired connection. In some embodiments, the transmission may be received via an RNC, and/or using a RANAP protocol, as described above. In one embodiment, information indicative of the measurement or statistic is received over the backhaul utilizing a RIM procedure.

In some embodiments, step 1004 comprises receiving a statistic of a plurality of measurements instead of or in addition to the measurement. The statistic may be received using any of the methods or techniques described above.

Moving to step 1006, a transmission power is adjusted, for example to alter the power which the transmitting unit 502 uses to transmit subsequent signals. The transmission power may be adjusted by the power adjusting module 506, for example. In some embodiments, the transmission power is adjusted after receiving every measurement and/or statistic. In other embodiments, the transmission power is adjusted after receiving a predetermined number of measurements and/or statistics. In some embodiments, the power is always adjusted at a predetermined interval or after a certain event. Thus, the transmission power would increase or decrease after every interval or event.

In other embodiments, the power adjusting module 506 may determine whether to adjust the transmission power or not. For example, the power adjusting module 506 may determine that no power adjustment is necessary when a received measurement and/or statistic is within a predetermined range. Thus, the transmission power of the femto node 210 may remain substantially static or consistent for a significant amount of time.

The transmission power of the transmitting module 502 may be adjusted based on any of the statistics discussed above. For example, the femto node 210 may receive a statistic from the macro node 205 indicating an average interference experienced by MUEs in the macro area 230 due to signals being transmitted by the femto node 210. At step 1006, the power adjusting module 506 may decrease the transmission power of the femto node 210 if the average interference is higher than a first threshold. If the average interference is lower than a second threshold or the femto node 210 doesn't receive any information regarding interference with MUEs, the power adjusting module 506 may increase the transmission power. The first and the second thresholds may be the same, or may differ in some embodiments.

In some embodiments, the power adjusting module 506 is configured to adjust the transmission power by a predetermined amount each time the transmission power is changed. For example, when the femto node 210 receives a measurement from the UE 222 indicating that an SNR determined from a signal transmitted at step 1002 is lower than a threshold, the power adjusting module 506 may increase the power by the predetermined amount.

In some embodiments, the transmission power is adjusted in proportion to a difference between a received measurement and target measurement. For example, when the femto node 210 receives a measurement from the UE 222 indicating that a signal quality of the signal transmitted at step 1002 is lower than a target quality, the power adjusting module 506 may increase the power by an amount that is proportional to the difference between the measured signal quality and the target quality. Thus, the amount by which the power adjusting module 506 adjusts the transmission power may be determined as $\Delta P = a*(P_{Target} - P_{measured})$, where a is some scaling factor. The factor a may be constant, or may be varied based on received communications or varying environmental conditions, for example as determined by the network listen module 510.

In some embodiments, the femto node 210 may be configured to determine or estimate a range of the signals being broadcast at step 1002. For example, the femto node 210 may be configured to receive information indicative of a path loss at step 1004, and may use the path loss information to estimate the size or coverage of the femto area 215. Based on this estimate, the power adjusting module 506 may change the transmission power in an attempt to match the femto area 215 to a desired coverage area. In some embodiments, the desired coverage area is static. In other embodiments, the location of one or more UEs, for example the UE 222, may be determined and the coverage area may be based on that location. As another example, a transmission power of the femto node 210 may be adjusted based on a distance from the transmitting module 502 where UEs registered with the femto node 210 are handing off to a different serving node.

The power may be adjusted using a short-term calibration scheme and/or using a long-term calibration scheme. In one embodiment, a short-term calibration scheme may include adjusting the transmission power to conform the measurement of a transmitted signal to a target measurement. For example, the target measurement may comprise a maximum interference of a specific UE being served by the femto node 210, for example the UE 222. If the measurement received at step 1004 indicates that the UE 222 is experiencing the interference greater than the maximum interference when receiving a signal transmitted at step 1002, the power adjusting module 506 may temporarily increase the transmission power. When the femto node 210 receives another measurement indicating that the UE 222 is no longer experiencing interference greater than the maximum interference, the power adjusting module 506 may decrease the transmission power, for example back to the previous power. Alternatively, the transmission power may be gradually increased according to a recovery schedule. In some embodiments, the target measurement comprises a maximum interference of a UE being served by a node other than the femto node 210, for example the UE 220. In these embodiments, the power adjusting module 506 may temporarily decrease the transmission power in order to protect the UE 220 from undue interference by the femto node 210 when the UE 220 is experiencing interference above the maximum interference. When the UE 220 is no longer experiencing interference greater than the maximum interference, the power adjusting module 506 may increase the transmission power.

In one embodiment, a long-term calibration scheme may include adjusting the default transmission power based on a measurement or statistic indicative of a period of time. For example, the femto node 210 may receive a statistic from the macro node 205 at step 1004 indicating a quantity of MUEs that saw the signal transmitted at step 1002 over the course of a day. If the quantity is greater than a threshold, the power adjusting module 506 may adjust the default transmission power at step 1006 so that transmissions the following day will begin with being transmitted at the new transmission power.

In some embodiments, a short-term calibration scheme and a long-term calibration scheme may be combined. For example, the power adjusting module 506 may be configured to adjust the default transmission power of the transmitting module 502 if a short-term calibration scheme was used more than a maximum number of times in a twelve hour timeframe.

Those of skill in the art will appreciate other schemes, methods, and techniques of adjusting the power at step 1006. Although the above description of adjusting a transmission power described measurements based on a signal transmitted from the femto node 210, those of skill in the art will appreciate that similar techniques may be used to adjust the transmission power based on information indicative of measurements of a signal received from the macro node 205. For example, a measurement of a strength of a pilot transmitted from the macro node 205 and received near the femto area 215 may be compared to a threshold. If the measurement is below the threshold, the femto node 210 may determine that interference with the macro node 205 isn't likely in the femto area 215 and the power adjusting module 506 may increase the transmission power.

Continuing to step 1008, a signal is transmitted, for example by the transmitting unit 502, using the adjusted power from step 1006. The transmitting may comprise sending a signal similar to the signal transmitted at step 1002, for example sending a second pilot with the adjusted power if the measurement received at step 1004 pertained to a first pilot transmitted at step 1002. In some embodiments, the signal transmitted at step 1008 may be a different type of signal than transmitted at step 1002. For example, the signal transmitted at step 1002 may comprise a pilot signal, and the signal transmitted at step 1008 may comprise a signal encoding user data. The signal may be wirelessly transmitted at step 1008, and may be transmitted to any number of devices, for example the UE 222, the femto node 212, and/or the macro node 205. The signal may also be broadcast at step 1008 such that it may be received by any device in the femto area 215.

Figure 11:
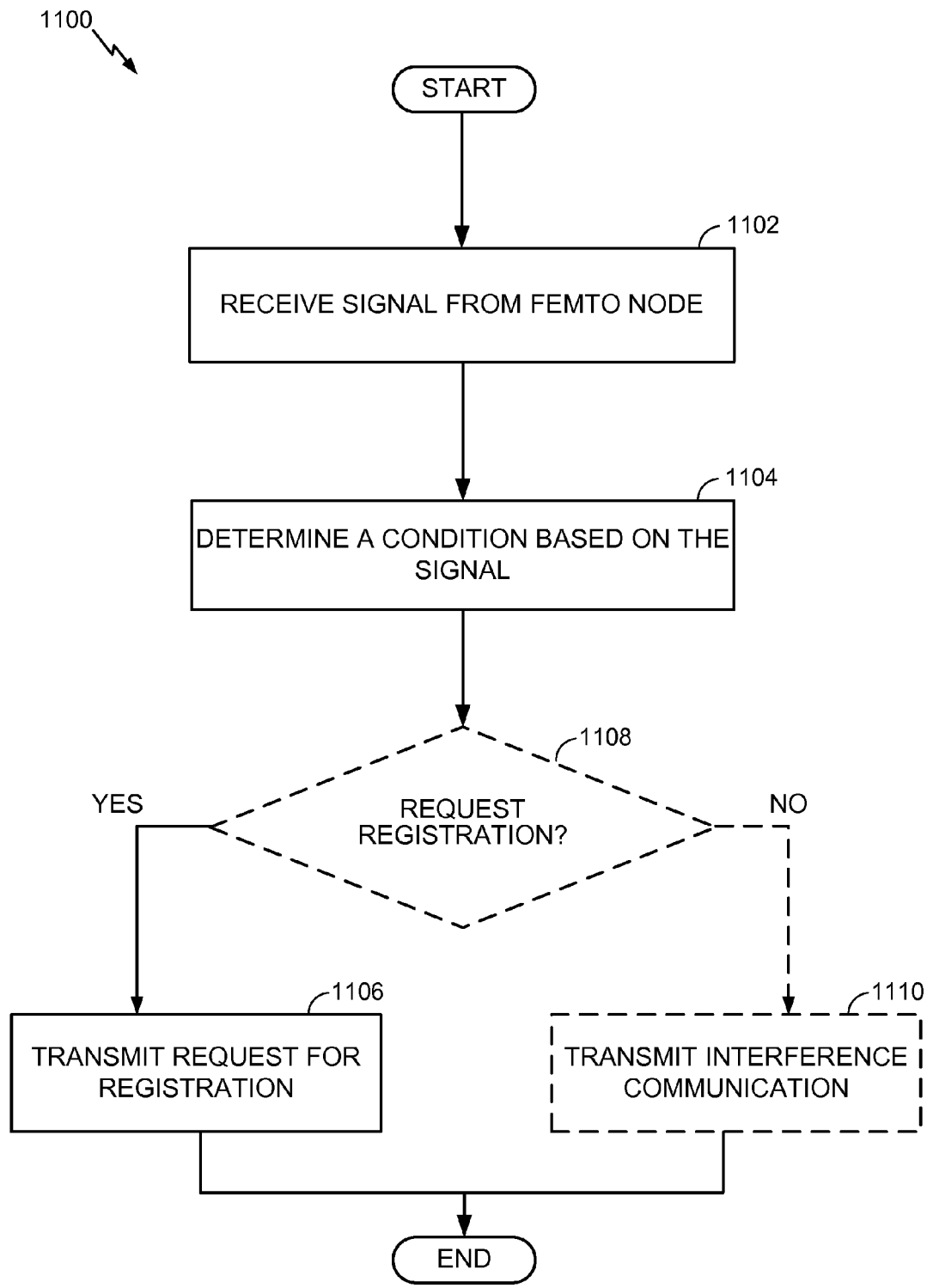
FIG. 11 is a flow chart illustrating an exemplary process of communication for a user equipment.

FIG. 11 illustrates another exemplary method 1100 of communication for a user equipment, for example the UE 221. Although the method 1100 will be described below with respect to elements of the UE 221, those of skill in the art will appreciate that other components may be used to implement one or more of the steps described herein, and that the method 1100 may be practiced by other devices.

At step 1102, a signal is received from a femto node. For example, at step 1102, the receiving module 602 may see a pilot signal or data communication from the femto node 210. At the time of receiving the signal at step 1102, the femto node from which the signal was received may not be the UE 221's serving node.

At step 1104, a condition is identified based on the signal received at step 1102. In some embodiments, the condition comprises an interference condition. The interference condition may comprise any of the conditions discussed above with respect to FIG. 6. In some embodiments, the condition comprises a handoff condition. As described above, the handoff condition may comprise the identification of a SNR of the signal received at step 1102 that is higher than an SNR of a pilot signal received from the serving node. The interference condition and the handoff condition may be similar, or in some embodiments may be different.

Moving to step 1106, a request for registering with the femto node from which the signal was received at step 1102 may be transmitted to the femto node. For example, if the UE 221 identifies a handoff condition at step 1104 due to a pilot received from the femto node 210, the UE 221 may attempt to register with the femto node 210. The request for registration may be generated and/or transmitted as described above with respect to FIG. 6. In some embodiments of the UE 221, the UE 221 may be configured to request registration with the femto node regardless of whether the UE 221 is permitted to register with the femto node. For example, some embodiments of the UE 221 may not be configured with functionality to determine whether the UE 221 may register with any given femto node.

At step 1108, an appropriately configured UE 221 may determine whether to request registration. This determination may be based on whether the condition identified at step 1104 was an interference condition or a handoff condition. For example, if the UE 221 detects a handoff condition at step 1104 based on a signal received from the femto node 210, and determines that the UE 221 may register with the femto node 210, the UE 221 may generate and transmit a request for registration at step 1106. Some embodiments of the UE 221, however, may not be configured to make the determination at step 1108.

In UE 221 that are configured to make this determination, however, the UE 221 may determine that the UE 221 is not allowed to register with the femto node and consequently does not request registration. For example, the UE 221 may use the registration module 606 to make this determination. The registration module 606 may determine that the femto node is not a preferred node of the UE 221, or may determine that the femto node cannot be identified in a set of allowed nodes stored in the storing module 610, for example. Techniques of determining whether a UE is allowed to register with a node were described above with respect to FIG. 6. Further, the UE 221 may determine that an interference condition was identified at step 1104 instead of a handoff condition.

Proceeding to step 1110, an appropriately configured UE 221 may transmit an interference communication. In some embodiments, the interference communication may be transmitted directly to the femto node from which the signal was received at step 1102. For example, if the UE 221 is being served by the femto node 212 in the femto area 217 and is located near the femto area 215, the UE 221 may see a pilot from the femto node 210 at step 1102 that has seeped out of the femto area 215. The UE 221 may identify an interference condition based on the signal at step 1104, and may also determine that the UE 221 is not allowed to register with the femto node 210. Consequently, the UE 221 may generate an interference communication and wirelessly transmit the interference communication in an OTA message, for example, to the femto node 210 at step 1110. Transmission of an interference communication was discussed above with respect to FIG. 6.

Figure 12:
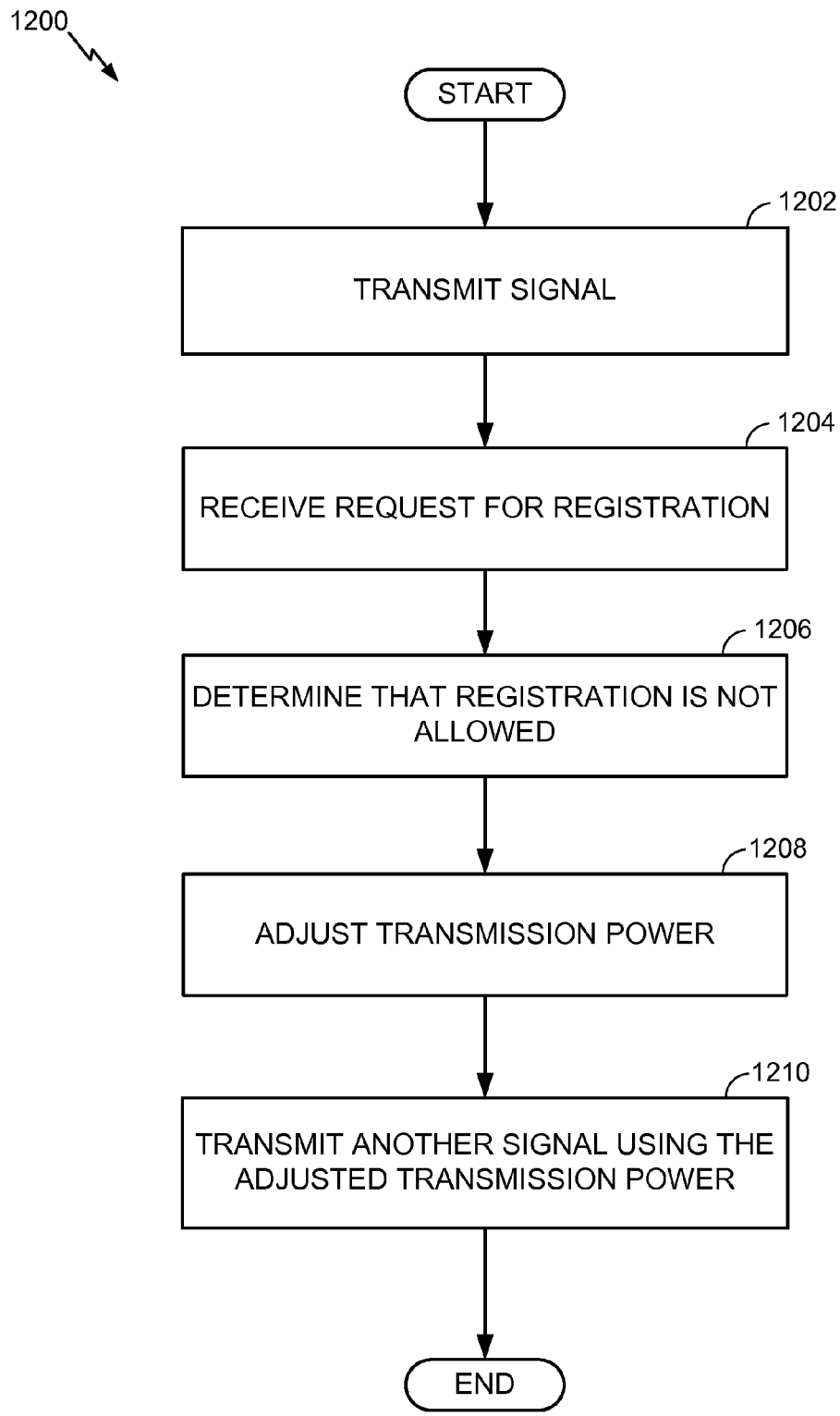
FIG. 12 is a flow chart illustrating an exemplary process of adjusting a transmission power for a femto node.

FIG. 12 illustrates an exemplary method 1200 of adjusting a transmission power for a femto node, for example the femto node 210. Although the method 1200 will be described below with respect to elements of the femto node 210, those of skill in the art will appreciate that other components may be used to implement one or more of the steps described herein, and that the method 1200 may be practiced by other devices.

At step 1202, a signal is transmitted, for example using the transmitting module 502. As described above, the signal may comprise a pilot signal, and may be transmitted over one or more channels. For example, the signal may be a pilot signal transmitted over a CPICH. In some embodiment, the signal encodes user or voice data.

Moving to step 1204, a request for registration with the femto node 210 is received, for example by the receiving module 508. The request may be wirelessly received from a UE, for example the UE 220. Requests for registration were described above with respect to FIG. 6.

Proceeding to step 1206, it is determined that the UE requesting registration is not allowed to register with the femto node 210, for example using the registration unit 512. In one embodiment, the requesting UE does not belong to a CSG or a CUG of the femto node 210. For example, if the UE 220 requests registration with the femto node 210, but is not identified by information stored in the registration unit 512 and/or the storing module 504, the registration unit 512 may determine that the UE 220 is not allowed to register with the femto node 210. Techniques for identifying UE that are allowed to register with the femto node 210 were discussed above with respect to FIG. 5.

Next, at step 1208, a transmission power of the femto node 210 is adjusted, for example using the power adjusting module 506, based on the request received at step 1204 or a plurality of received requests. Unsuccessful requests for registration may be an indication that the signal transmitted at step 1202 is causing excessive interference. For example, the UEs requesting registration with the femto node 210 may be seeing the femto node 210 as a strong base station, and attempting to dissociate with their serving nodes so that they can hand off to the femto node 210.

In some embodiments, adjusting the power at step 1208 is event driven. For example, the power adjusting module 506 may reduce the transmission power be a predetermined amount or step (e.g., x dB for some predetermined value of x) for each unsuccessful registration attempt received by the receiving module 508. The transmission power may be gradually increased later according to a recovery schedule, for example, an increase of y dB every hour for some predetermined value of y. Further, the transmit power may be subject to lower and upper limits. The limits may be fixed, or may be adjustable based on power calibration techniques, for example by the power adjusting module 506.

In some embodiments, the power is only adjusted at step 1208 after a predetermined number of unsuccessful registration attempts have been received. In some embodiments, the power adjusting module 506 does not adjust the transmission power unless the predetermined number of unsuccessful registration attempts were received within a specified period of time. The power may be adjusted by an amount that is proportional to the number of unsuccessful registration attempts in excess of the predetermined number in the specified period of time. The predetermined number and/or the specified time may be adjusted, for example in conjunction with the statistical approach discussed below, if the power is adjusted more often than a maximum adjustment limit.

Adjusting the transmission power on an event-driven basis may increase the response of the femto node 210 to sudden changes in the number of UEs in the femto area 215. For example, if the femto node 215 is located near a bus stop, the femto node 210 can responds to a large influx of UEs, for example when a bus full of UEs that are not allowed to register with the femto node 210 are nearby.

In some embodiments, adjusting the power at step 1208 is statistical. For example, the femto node 210 may determine and maintain one or more statistics based on the unsuccessful registration attempts. In one embodiment, the femto node 210 is configured to determine an average number of unsuccessful registration attempts for a defined time period, for example a day. In another embodiment, the femto node 210 is configured to determine a ratio of unsuccessful registration attempts to successful registration attempts. In some embodiments, the femto node 210 is configured to determine a histogram of average number of registration attempts by hour of the day. In other embodiments, the femto node 210 is configured to apply other statistical filters such as moving averages or autoregressive filters on the count of unsuccessful registration attempts. The power for transmitting signals from the transmitting module 502 may be adjusted based on this information, for example according to a schedule such as at midnight every night or once an hour.

Adjusting the transmission power using such statistics may increase the operability of the femto node 210 in the context of recurring variations in UE traffic. For example, the power adjusting module 506 may be configured to increase the transmission power at rush hour on the weekdays, or during meal times if located near a restaurant.

In some embodiments, the femto node 210 is configured to maintain a record of UEs, for example in the storing module 504, from which it routinely receives unsuccessful registration attempts. The femto node 210 may be configured to ignore registration attempts from these UEs. For example, these UEs might belong to users that live in close proximity to the femto node 210, or may belong to users that are visiting the owner of the femto node 210. In some embodiments, the femto node 210 may be configured to ignore unsuccessful registration attempts from a UE if the number of unsuccessful registration attempts from that UE exceed a maximum request limit, for example during a predetermined time period. In some embodiments, a user or administrator of the femto node 210 may manually program to femto node 210 to recognize certain visitor or neighbor UEs.

In some embodiments, the femto node 210 may receive a measurement or information indicative thereof that is associated with the request for registration. For example, when a UE determines a handoff condition based on a signal transmitted by the femto node 210 at step 1202, the UE may also determine a measurement to transmit to the femto node 210 with the registration request, or may transmit information regarding the handoff condition with the registration request. In these embodiments, adjusting the transmission power at step 1208 may be based at least partially on this additional received information. For example, the amount of change in the transmission power may be based on the measurement. In some embodiments, requests for registration that are associated with a measurement indicating an interference below a threshold are ignored by the power adjusting module 506. Those of skill in the art will appreciate other ways in which to utilize associated measurement information when adjusting the power at step 1208.

As described above, the femto node 210 may adjust the transmission power based on a characteristic of an unsuccessful request for registration. For example, the femto node 210 may be configured to ignore a failed registration attempt when adjusting transmission power if the failed registration attempt is associated with a measurement indicating an interference below a threshold. Similarly, the femto node 210 may be configured to consider another failed registration attempt when adjusting transmission power if the other failed registration attempt is associated with a measurement that is at least as great as the threshold. In some embodiments, failed registrations attempts are weighted differently based on a characteristic. For example, failed registration attempts received during a known rush hour, or received from a visitor UE or a UE that has exceeded a maximum request limit, may only count as a fraction of a failed registration attempt received during a non-rush hour, or received from a non-visitor UE or UE that hasn't exceeded the maximum request limit, when the femto node 210 is determining or calculating an amount to adjust the transmission power. Therefore, the femto node 210 may be configured such that not all failed registration attempts are treated equally, and the unequal treatment may be based on characteristics of the failed registration attempts as described above. Those of skill in the art will appreciate other ways characteristics of unsuccessful registration attempts which may be utilized by the femto node 210 for power determination.

Continuing to step 1210, a signal is transmitted, for example by the transmitting unit 502, using the adjusted power from step 1208. The transmitting may comprise sending a signal similar to the signal transmitted at step 1202, or a different type of signal than transmitted at step 1202. The signal may be wirelessly transmitted at step 1210, and may be transmitted to any number of devices or broadcast such that it may be received by devices in the femto area 215.

Figure 13:
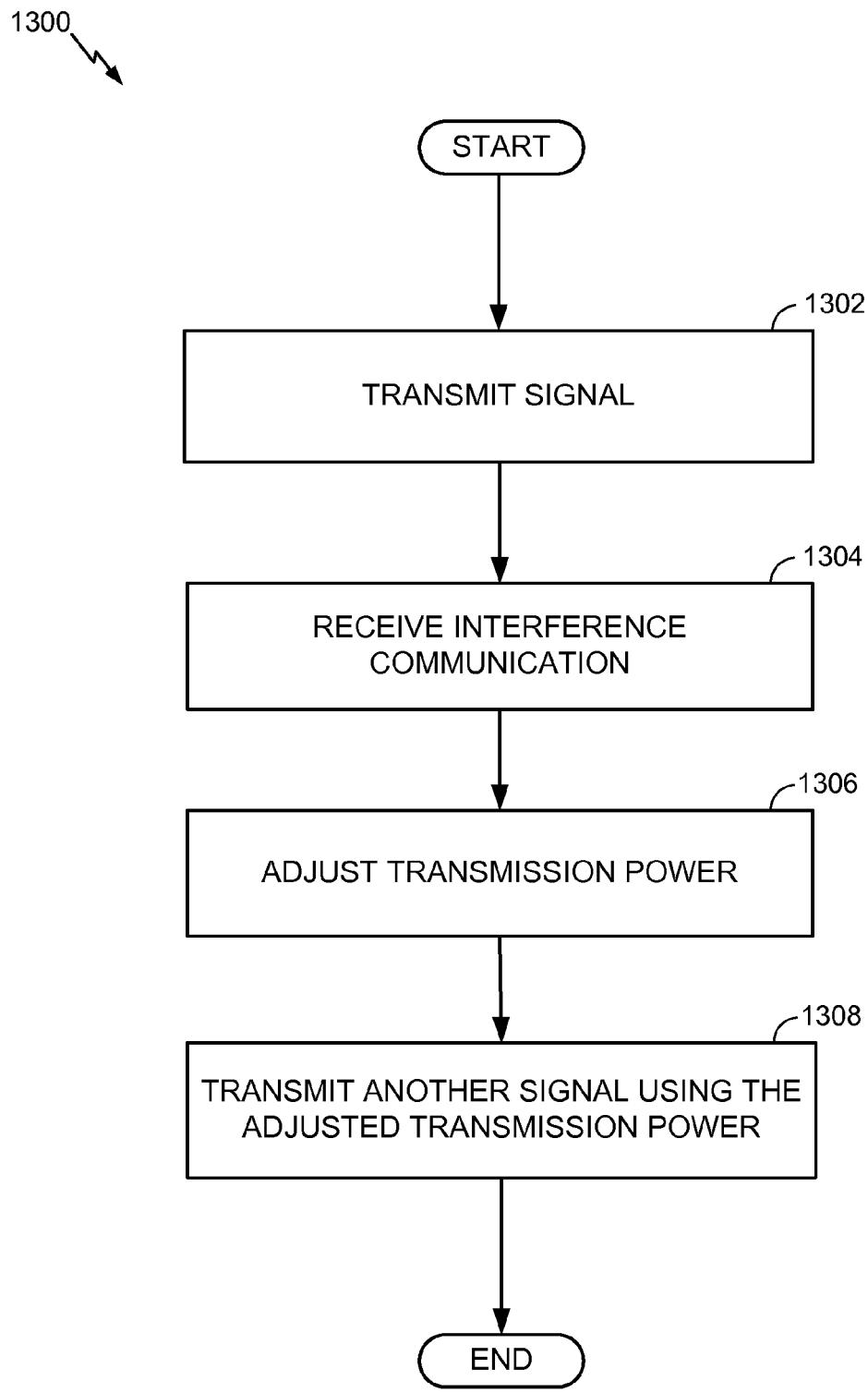
FIG. 13 is a flow chart illustrating an exemplary process of adjusting a transmission power for a femto node.

FIG. 13 illustrates an exemplary method 1300 of adjusting a transmission power for a femto node, for example the femto node 210. Although the method 1300 will be described below with respect to elements of the femto node 210, those of skill in the art will appreciate that other components may be used to implement one or more of the steps described herein, and that the method 1300 may be practiced by other devices.

At step 1302, a signal is transmitted, for example using the transmitting module 502. As described above, the signal may comprise a pilot signal, and may be transmitted over one or more channels. For example, the signal may be a pilot signal transmitted over a CPICH. In some embodiment, the signal encodes user or voice data.

At step 1304, an interference communication is received, for example by the receiving module 508. The request may be wirelessly received from a UE, for example the UE 220. Interference communications were described above with respect to FIG. 6.

At step 1306, a transmission power of the femto node 210 is adjusted, for example using the power adjusting module 506, based on the interference communication received at step 1304 or a plurality of received requests. Adjusting the power at step 1206 may comprise adjusting the power on an event-driven basis or on a statistical basis, for example using methods similar to those described above with respect to step 1208 of FIG. 12. Those of skill in the art will appreciate that a technique used to adjust the power at step 1306 does not need to be the same as a technique used to adjust the power at step 1208. In some embodiments, however, the technique used at step 1306 is similar to the technique used at step 1208, although any thresholds or predetermined values used in the techniques may vary.

In some embodiments, the femto node 210 is configured to maintain a record of UEs, for example in the storing module 504, from which it routinely receives interference communications. The femto node 210 may be configured to ignore interference communications from these UEs. In some embodiments, the femto node 210 may be configured to ignore interference communications from a UE if the number of such communications from that UE exceed a limit, for example during a predetermined time period.

In some embodiments, the femto node 210 may receive a measurement or information indicative thereof that is associated with the interference communication. In these embodiments, adjusting the transmission power at step 1306 may be based at least partially on this additional received information, for example similar to the way in which adjusting the power at step 1208 may be based on additional received information.

In some embodiments, the femto node 210 may be configured to treat requests for registration and interference communications the same for purposes of adjusting the power. For example, an average number of communications in a specific hour of the day may be calculated from the aggregate of registration requests and interference communications received during that hour. Even if the femto node 210 does not distinguish between registration requests and interference communications for purposes of transmission power adjustment, however, the femto node 210 may be configured to handle registration requests and interference communications separately for other functions. For example, the femto node 210 may be configured to respond to unsuccessful registration requests, for example with a denial message or a NACK, while being configured to send no response after receiving an interference communication. In some embodiments, registration requests and interference communications are handled separately by the femto node 210 for purposes of transmission power adjustment, for example by different state machines of the femto node 210. Thus, a statistic for registration requests may be maintained separate from a statistic for interference communications.

Moving to step 1308, a signal is transmitted, for example by the transmitting unit 502, using the adjusted power from step 1206. The transmitting may comprise sending a signal similar to the signal transmitted at step 1302, or a different type of signal than transmitted at step 1302. The signal may be wirelessly transmitted at step 1308, and may be transmitted to any number of devices or broadcast such that it may be received by devices in the femto area 215.

Those of skill in the art will appreciate that the devices, systems, and methods described herein may be used to adjust the power of a femto node. For example, femto nodes or other are low power basestations may be deployed along with conventional WAN basestations such MNBs in a wireless network. The femot nodes may be configured to provide superior data rates and coverage to home subscribers. These femto nodes, however, may be deployed in an unplanned fashion. Thus, management of interference caused by the femto nodes to the macro network or nearby femto nodes is advantageous. Those of skill in the art will appreciate that the devices, systems, and methods described herein may be used to protect MUEs or other UEs not communicating with a femto node (for example UEs that are not in the CSG of the femto node) from interference by adjusting or limiting the transmit power of the femto node, for example for pilot, overhead and data channels. These devices, systems, and methods may strike a balance between the femto coverage area and interference impact on MUEs In this way, inaccurate power settings for the femto node, for example due to assumptions made by the network listen module, may be reduced or avoided. For example, situations where too much interference for MUEs can be reduced, as can situations of inadequate coverage for the femto node. In addition, femto nodes as described herein may be traffic aware, for example considering whether any MUEs are actually being affected by the power setting of the femto node. Those of skill in the art will appreciate that the devices, systems, and methods described herein may be used in conjunction with power adjustment schemes known in the art, for example methods relying on measurements from the network listen module.

As described above, the devices, systems, and methods described herein may be used to adjust the power of a femto node. Using these devices, systems, and methods, femto nodes may consider whether they are causing or not causing interference to MUEs or if there are even any MUEs present. Furthermore, the femto nodes may consider situations where a mismatch exists between the RF conditions seen by a network listen module and a UE. Further, transmission power may be adjusted for deployments where initial parameters configured for self calibration are not valid. In these situations, the devices, systems, and methods described herein may achieve the desired coverage for HUEs while keeping the interference to other users (macro or neighbor femto) low. Femto nodes described herein may be made aware of true traffic conditions of MUEs in the femto node vicinity. If there are no or few MUEs being affected by transmissions of the femto node, the femto area may be increased. If a significant number of MUEs are being interfered with, the femto node may be able to appropriately respond. In some embodiments, messaging from the macro network is not required, as the femto node may receive communications directly from UEs or other femto nodes. Some embodiments describe techniques that may account for a sudden influx of MUEs. In addition, statistics-based techniques may be used to respond to time variations in MUE traffic. Further, techniques described herein may provide backoff mechanisms which allow aggressive initial setting of the femto node transmission power with appropriate subsequent reduction of the transmit power, for example which may be beneficial for large houses or other large femto areas.

Although described separately, it is to be appreciated that functional blocks described with respect to FIGS. 4, 5, 6, and 7 need not be separate structural elements. For example, the power adjusting module 506 and the registration unit 512 may be embodied in a single chip. Some modules may be implemented by a processing module, either separately or jointly. The processing module may contain memory, such as registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to FIGS. 4, 5, 6, and 7, such as the processing power adjusting module 506, signal measuring module 64, and/or the statistic module 704, may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to FIGS. 4, 5, 6, and 7 may also be implemented as a combination of computing devices, e.g., a combination of a DSP and a microprocessor, a plurality of microprocessors, one or more microprocessors in conjunction with a DSP communication, or any other such configuration.

The functionality described herein (e.g., with regard to one or more of the accompanying figures) may correspond in some aspects to similarly designated "means for" functionality in the appended claims. Referring to FIGS. 5, 6, and 7, the femto node 210, the UE 222, and the macro node 205 are represented as a series of interrelated functional modules.

The functionality of the modules of FIGS. 4, 5, 6, and 7 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

While the specification describes particular examples of the present invention, those of ordinary skill can devise variations of the present invention without departing from the inventive concept. For example, some of the teachings herein may refer to circuit-switched network elements but are equally applicable to packet-switched domain network elements.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. An apparatus for wireless communication, the apparatus comprising:
   a transmitter configured to wirelessly transmit a first signal with a first power to a reception region;
   a receiver configured to wirelessly receive a request for registration from one or more user devices;
   a registration unit configured to store information identifying at least one user device, wherein only user devices that are identified in the registration unit are permitted to communicate with other user devices via the transmitter and via the receiver; and
   a power adjustment unit configured to adjust the first power based at least in part on a characteristic of the request for registration from the one or more user devices if information in the registration unit does not identify the one or more user devices.

2. The apparatus of claim 1, wherein the receiver is located within a second reception region and a second signal is wirelessly transmitted to the one or more user devices in the second reception region from a second transmitter, the second reception region being substantially larger than the reception region.

3. The apparatus of claim 1, further comprising a processor configured to collect statistical information related to the request for registration in order to identify if the request for registration is an indication of excessive interference at the one or more user devices.

4. The apparatus of claim 3, wherein the receiver is further configured to receive information from the one or more user devices indicative of a measurement derived from reception of the first signal at the one or more user devices, and wherein the characteristic comprises the measurement at least in part.

5. The apparatus of claim 4, wherein the information indicative of the measurement indicates a path loss of the first signal at each of the one or more user devices and is associated with the request for registration of each of the one or more user devices, wherein requests for registration associated with a path loss that is less than a predetermined threshold are ignored during the collection of the collected statistical information.

6. The apparatus of claim 3, wherein the power adjustment unit is configured to utilize an upper and a lower limit for the first power, wherein the upper limit and the lower limit are identified based upon at least one of the received request for registration or the collected statistical information.

7. The apparatus of claim 3, wherein the power adjustment unit is configured to adjust the first power based on the collected statistical information, wherein the collected statistical information comprises at least one of an average number of the requests for registration received over a predetermined duration, a histogram of a number of the requests for registration received over a plurality of predetermined times, a moving average of a number of the requests for registration received by the receiver, and an autoregressive filter on an amount of the requests for registration received by the receiver.

8. The apparatus of claim 1, wherein the power adjustment unit is configured to reduce the first power by a predetermined amount for each unsuccessful request for registration having at least one predetermined characteristic.

9. The apparatus of claim 8, wherein the power adjustment unit is configured to gradually increase the first power according to a predetermined recovery schedule subsequent to the first power being reduced.

10. The apparatus of claim 1, wherein the power adjustment unit is configured to adjust the first power at least in part based on at least one of a home user device measurement report, a macro user device measurement report, and information from a network listen module.

11. The apparatus of claim 1, wherein the power adjustment unit is configured to defer adjustment of the first power until a predetermined quantity of unsuccessful requests for registration have been received.

12. The apparatus of claim 11, wherein the power adjustment unit is configured to adjust the first power only if the predetermined quantity of the unsuccessful requests for registration were received within a defined period.

13. The apparatus of claim 12, further comprising a processor configured to adjust the predetermined quantity or the defined period if the power adjustment unit adjusts the first power more frequently than a maximum adjustment limit during the defined period.

14. The apparatus of claim 1, further comprising a memory configured to store the information identifying the one or more user devices, wherein the power adjustment unit is configured to ignore requests for registration in excess of a maximum request limit received from at least one of the one or more user devices.

15. The apparatus of claim 1, wherein the power adjustment unit is configured to adjust the first power by an amount proportional to a quantity of the requests for registration received within a defined period.

16. The apparatus of claim 1, wherein the characteristic comprises at least in part a time of day at which the request for registration was received.

17. The apparatus of claim 1, wherein the characteristic comprises at least in part a user device from which a first request for registration was received.

18. A method of wireless communication, the method comprising:
    wirelessly transmitting a first signal with a first power to a reception region;
    receiving a request for registration from one or more user devices;
    determining that the one or more user devices are not identified in a registration unit configured to store information identifying at least one user device; and
    adjusting the first power based at least in part on a characteristic of the request for registration from the one or more user devices.

19. The method of claim 18, wherein the receiving is performed within a second reception region and a second signal is wirelessly transmitted to the one or more user devices in the second reception region from a transmitter, the second reception region being substantially larger than the reception region.

20. The method of claim 18, further comprising collecting statistical information related to the request for registration in order to identify if the request for registration is an indication of excessive interference at the one or more user devices.

21. The method of claim 20, further comprising receiving information from the one or more user devices indicative of a measurement derived from reception of the first signal at the one or more user devices, wherein the characteristic comprises the measurement at least in part.

22. The method of claim 21, wherein the information indicative of the measurement indicates a path loss of the first signal at each of the one or more user devices and is associated with the request for registration of each of the one or more user devices, wherein requests for registration associated with a path loss that is less than a predetermined threshold are ignored during the collection of the collected statistical information.

23. The method of claim 20, wherein the adjusting comprises utilizing an upper and a lower limit for the first power, wherein the upper limit and the lower limit are identified based upon at least one of the received request for registration or the collected statistical information.

24. The method of claim 20, wherein the adjusting comprises adjusting the first power based on the collected statistical information, wherein the collected statistical information comprises at least one of an average number of the requests for registration received over a predetermined duration, a histogram of a number of the requests for registration received over a plurality of predetermined times, a moving average of a number of the requests for registration received by the receiving, and an autoregressive filter on an amount of the requests for registration received by the receiving.

25. The method of claim 18, wherein the adjusting comprises reducing the first power by a predetermined amount for each received unsuccessful request for registration having at least one predetermined characteristic, wherein the adjusting comprises gradually increasing the first power according to a predetermined recovery schedule subsequent to reducing the first power.

26. The method of claim 18, wherein the adjusting comprises adjusting the first power at least in part based on at least one of a home user device measurement report, a macro user device measurement report, and information from a network listen module.

27. The method of claim 18, further comprising deferring adjustment of the first power until a predetermined quantity of unsuccessful requests for registration have been received.

28. The method of claim 27, wherein the adjusting is performed only if the predetermined quantity of the unsuccessful requests for registration were received within a defined period.

29. The method of claim 28, further comprising adjusting the predetermined quantity or the defined period if the first power is adjusted more frequently than a maximum adjustment limit during the defined period.

30. The method of claim 18, wherein requests for registration in excess of a maximum request limit received from at least one of the one or more user devices are ignored.

31. The method of claim 18, wherein the adjusting comprises adjusting the first power by an amount proportional to a quantity of the requests for registration received within a defined period.

32. The method of claim 18, wherein the characteristic comprises at least in part a time of day at which the request for registration was received or a user device from which a first request for registration was received.

33. An apparatus for wireless communication, the apparatus comprising:
    means for wirelessly transmitting a first signal with a first power to a reception region;
    means for receiving a request for registration from one or more user devices;
    means for determining that the one or more user devices are not identified in a registration unit configured to store information identifying at least one user device; and
    means for adjusting the first power based at least in part on a characteristic of the request for registration from the one or more user devices.

34. The apparatus of claim 33, wherein the means for receiving is located within a second reception region and a second signal is wirelessly transmitted to the one or more user devices in the second reception region from a transmitter, the second reception region being substantially larger than the reception region.

35. The apparatus of claim 33, further comprising means for collecting statistical information related to the request for registration in order to identify if the request for registration is an indication of excessive interference at the one or more user devices.

36. The apparatus of claim 35, further comprising means for receiving information from the one or more user devices indicative of a measurement derived from reception of the first signal at the one or more user devices, wherein the characteristic comprises the measurement at least in part.

37. The apparatus of claim 36, wherein the information indicative of the measurement indicates a path loss of the first signal at each of the one or more user devices and is associated with the request for registration of each of the one or more user devices, wherein the apparatus further comprises means for ignoring requests for registration associated with a path loss that is less than a predetermined threshold are ignored during the collection of the collected statistical information.

38. The apparatus of claim 35, wherein the means for adjusting is configured to utilize an upper and a lower limit for the first power, wherein the upper limit and the lower limit are identified based upon at least one of the received request for registration or the collected statistical information.

39. The apparatus of claim 35, wherein the means for adjusting is configured to adjust the first power based on the collected statistical information, wherein the collected statistical information comprises at least one of an average number of the requests for registration received over a predetermined duration, a histogram of a number of the requests for registration received over a plurality of predetermined times, a moving average of a number of the requests for registration received by the means for receiving, and an autoregressive filter on an amount of the requests for registration received by the means for receiving.

40. The apparatus of claim 33, wherein the means for adjusting comprises means for reducing the first power by a predetermined amount for each received unsuccessful request for registration having at least one predetermined characteristic, and wherein the means for adjusting comprises means for gradually increasing the first power according to a predetermined recovery schedule subsequent to reducing the first power.

41. The apparatus of claim 33, wherein the means for adjusting comprises means for adjusting the first power at least in part based on at least one of a home user device measurement report, a macro user device measurement report, and information from a network listen module.

42. The apparatus of claim 33, further comprising means for deferring adjustment of the first power until a predetermined quantity of unsuccessful requests for registration have been received.

43. The apparatus of claim 42, wherein the means for adjusting is configured to adjust the first power only if the predetermined quantity of the unsuccessful requests for registration were received within a defined period.

44. The apparatus of claim 43, further comprising means for adjusting the predetermined quantity or the defined period if the first power is adjusted more frequently than a maximum adjustment limit during the defined period.

45. The apparatus of claim 33, further comprising means for ignoring requests for registration in excess of a maximum request limit received from at least one of the one or more user devices are ignored.

46. The apparatus of claim 33, wherein the means for adjusting comprises means for adjusting the first power by an amount proportional to a quantity of the requests for registration received within a defined period.

47. The apparatus of claim 33, wherein the characteristic comprises at least in part a time of day at which the request for registration was received or a user device from which a first request for registration was received.

48. A non-transitory computer-readable medium comprising
code for causing the computer to wirelessly transmit a first signal with a first power to a reception region;
code for causing the computer to receive a request for registration from one or more user devices;
code for causing the computer to determine that the one or more user devices are not identified in a registration unit configured to store information identifying at least one user device; and
code for causing the computer to adjust the first power based at least in part on a characteristic of the request for registration from the one or more user devices.

49. The non-transitory computer-readable medium of claim 48, wherein the receiving is performed within a second reception region and a second signal is wirelessly transmitted to the one or more user devices in the second reception region from a transmitter, the second reception region being substantially larger than the reception region.

50. The non-transitory computer-readable medium of claim 48, wherein the non-transitory computer-readable medium further comprises code for causing the computer to collect statistical information related to the request for registration in order to identify if the request for registration is an indication of excessive interference at the one or more user devices.

51. The non-transitory computer-readable medium of claim 50, wherein the non-transitory computer-readable medium further comprises code for causing the computer to receive information from the one or more user devices indicative of a measurement derived from reception of the first signal at the one or more user devices, and wherein the characteristic comprises the measurement at least in part.

52. The non-transitory computer-readable medium of claim 51, wherein the information indicative of the measurement indicates a path loss of the first signal at each of the one or more user devices and is associated with the request for registration of each of the one or more user devices, wherein requests for registration associated with a path loss that is less than a predetermined threshold are ignored during the collection of the collected statistical information.

53. The non-transitory computer-readable medium of claim 50, wherein the adjusting comprises utilizing an upper and a lower limit for the first power, wherein the upper limit and the lower limit are identified based upon at least one of the received request for registration or the collected statistical information.

54. The non-transitory computer-readable medium of claim 50, wherein the code for causing the computer to adjust the first power comprises code for causing the computer to adjust the first power based on the collected statistical information, wherein the collected statistical information comprises at least one of an average number of the requests for registration received over a predetermined duration, a histogram of a number of the requests for registration received over a plurality of predetermined times, a moving average of a number of the requests for registration received by the computer, and an autoregressive filter on an amount of the requests for registration received by the computer.

55. The non-transitory computer-readable medium of claim 48, wherein the code for causing the computer to adjust the first power comprises code for causing the computer to reduce the first power by a predetermined amount for each received unsuccessful request for registration having at least one predetermined characteristic, wherein the code for causing the computer to adjust the first power comprises code for causing the computer to gradually increase the first power according to a predetermined recovery schedule subsequent to the first power being reduced.

56. The non-transitory computer-readable medium of claim 48, wherein the code for causing the computer to adjust the first power comprises code for causing the computer to adjust the first power at least in part based on at least one of a home user device measurement report, a macro user device measurement report, and information from a network listen module.

57. The non-transitory computer-readable medium of claim 48, wherein the non-transitory computer-readable medium further comprises code for causing the computer to defer adjustment of the first power until a predetermined quantity of the requests for registration have been received.

58. The non-transitory computer-readable medium of claim 57, wherein the code for causing the computer to adjust the first power is configured to adjust the first power only if the predetermined quantity of the requests for registration were received within a defined period.

59. The non-transitory computer-readable medium of claim 58, wherein the non-transitory computer-readable medium further comprises code for causing the computer to adjust the predetermined quantity or the defined period if the first power is adjusted more frequently than a maximum adjustment limit during the defined period.

60. The non-transitory computer-readable medium of claim 48, wherein the non-transitory computer-readable medium further comprises code for causing the computer to ignore requests for registration in excess of a maximum request limit received from at least one of the one or more user devices are ignored.

61. The non-transitory computer-readable medium of claim 48, wherein the code for causing the computer to adjust the first power comprises code for causing the computer to adjust the first power by an amount proportional to a quantity of the requests for registration received within a defined period.

62. The non-transitory computer-readable medium of claim 48, wherein the characteristic comprises at least in part a time of day at which the request for registration was received or a user device from which a first request for registration was received.

63. The apparatus of claim 1, wherein the apparatus is a femto node base station.

64. The method of claim 18, wherein the wirelessly transmitting, receiving, determining, and adjusting are performed by a femto node base station.

65. The apparatus of claim 33, wherein the apparatus is a femto node base station.

66. The non-transitory computer-readable medium of claim 48, wherein the computer is part of a femto node base station.

67. The apparatus of claim 1, wherein the characteristic corresponds to an average number of unsuccessful registration attempts in one day.

68. The method of claim 18, wherein the characteristic corresponds to an average number of unsuccessful registration attempts in one day.

* * * * *